United States Patent
Soejima

(10) Patent No.: US 8,950,111 B2
(45) Date of Patent: Feb. 10, 2015

(54) DEVICE FOR FIXING BIOMASS-BASED SOLAR HEAT AND CARBON DIOXIDE GAS, AND HOUSE EQUIPPED WITH SAME FIXING DEVICE

(75) Inventor: Yasumasa Soejima, Chikushi-gun (JP)

(73) Assignee: Plus Kaken Innovate Labo Co., Ltd., Fukuoka (JP)

( * ) Notice: Subject to any disclaimer, the term of this patent is extended or adjusted under 35 U.S.C. 154(b) by 794 days.

(21) Appl. No.: 13/061,249

(22) PCT Filed: Aug. 28, 2009

(86) PCT No.: PCT/JP2009/065121
§ 371 (c)(1),
(2), (4) Date: Feb. 28, 2011

(87) PCT Pub. No.: WO2010/024414
PCT Pub. Date: Mar. 4, 2010

(65) Prior Publication Data
US 2011/0148124 A1    Jun. 23, 2011

(30) Foreign Application Priority Data
Aug. 30, 2008  (JP) .................. 2008-222947

(51) Int. Cl.
A01G 9/02     (2006.01)
A01G 7/02     (2006.01)

(52) U.S. Cl.
CPC .. A01G 9/02 (2013.01); A01G 7/02 (2013.01); A01G 9/022 (2013.01)
USPC ....... 47/66.6; 47/17; 47/69; 47/80; 435/292.1

(58) Field of Classification Search
USPC ........... 47/59 R, 62 R, 1.4, 17, 18, 65.5, 66.6, 47/79, 80, 81; 435/292.1
See application file for complete search history.

(56) References Cited

U.S. PATENT DOCUMENTS

| | | | |
|---|---|---|---|
| 4,799,822 A | | 1/1989 | Wintermantel et al. |
| 2002/0046492 A1* | | 4/2002 | Haas .................. 47/79 |
| 2005/0247553 A1 | | 11/2005 | Ichikawa et al. |
| 2009/0313893 A1* | | 12/2009 | McIntyre ........... 47/79 |

FOREIGN PATENT DOCUMENTS

| | | |
|---|---|---|
| JP | 49-032393 | 3/1974 |
| JP | 52-099946 | 7/1977 |
| JP | 2-163007 | 6/1990 |

(Continued)

*Primary Examiner* — David Parsley
*Assistant Examiner* — Timothy Schwarz
(74) *Attorney, Agent, or Firm* — Jordan and Hamburg LLP

(57) ABSTRACT

There are provided a device for fixing biomass-based solar heat and carbon dioxide gas with a similarity to containerized culture having high crop productivity, which is capable of fixing carbon dioxide gas highly efficiently, while being compact and easily managed, and a house equipped with the fixing device having an energy circulation system. The fixing device for biomass-based solar heat and carbon dioxide gas is configured to include an air intake unit which takes air into a box, a mesh-like air and water flow-through unit laid in the bottom of the box that is configured to be open to the atmosphere, a water reservoir tray on which the box is mounted, and cultivation soil which is held inside the box. Further, in the house relating to the present invention, the fixing device for biomass-based solar heat and carbon dioxide gas is arranged in an area that gets a lot of sunshine.

11 Claims, 18 Drawing Sheets

(56) References Cited

FOREIGN PATENT DOCUMENTS

| JP | 8-011022 | 2/1996 |
| JP | 2001-340024 | 12/2001 |
| JP | 3553976 | 8/2004 |
| JP | 2005-272530 | 10/2005 |
| JP | 2005-295876 | 10/2005 |
| WO | WO-86/04211 | 7/1986 |

* cited by examiner

DEVICE FOR FIXING BIOMASS-BASED SOLAR HEAT AND CARBON DIOXIDE GAS, AND HOUSE EQUIPPED WITH SAME FIXING DEVICE

BACKGROUND OF THE INVENTION

The present invention relates to a device for fixing biomass-based solar heat and carbon dioxide gas, and a house equipped with the same fixing device having an energy circulation system.

Conventionally, cultivation of biomass (plant matter) has meant that biomass (plant matter) is cultivated after reclaiming a mountain forest or a firm ground and making it a farm field. Agriculture and forestry are technologies which have developed as important industries which preserve natural environment and supply food for mankind. Some methods of cultivating biomass in the yard or on the veranda using containers and the like have been implemented, as home gardening satisfying someone's taste (See JP 2005-295876).

However, conventional agricultural and forestry technology based on mountain forest and farm field is controlled by natural environment and lacks stability. On the other hand, though a hobby of home gardening has been developing in various ways as a miniature agricultural and forestry field, it is just an imitation of natural cultivation method and it is not to significantly improve productivity of agriculture and forestry.

Recently, modernization around the world has remarkably developed, and accordingly, increase in food demand due to increase in population and improvement in living standards, and increase in energy consumption due to industrialization, have increased amount of emission of carbon dioxide gas, have caused destruction of global environment and collapse of social structure, and consequently, serious crisis is imminent.

To solve this problem, it is the best strategy to increase the production of biomass which constitutes raw materials of food and biofuels by improving productivity of plant resources in place of further consumption rise in fossil fuels. However, since it is difficult to cope with an enormous amount of energy resources in place of fossil fuels by expanding conventional natural agriculture and forestry, agricultural and forestry technology for the purpose of getting a large amount of harvest by artificially arranging cultivation environment have become widespread.

A hydroponic cultivation and an attempt to artificially harvest in a plastic greenhouse of one's own farmland are some examples.

Further, today, since measures for reducing carbon dioxide gas which constitutes a cause of global warming due to development in industrialization is a more important issue to be immediately solved as international treaty and to be fateful for mankind than the food problem, regulation of the carbon dioxide emission has been under way and measures for reducing emission of carbon dioxide from the industrial viewpoint has been taken. Further, long-distance transportation of great deal of everyday commodities including food causes an enormous amount of energy loss and become a cause of various social problems.

SUMMARY OF THE INVENTION

However, the carbon dioxide gas regarded with hostility as a substance responsible for the warming is an important resource to mankind which is dispensable in producing food derived from the plant matters.

That is, it can be said that to improve cultivation technology of biomass (plant matter) which consumes carbon dioxide gas is a concrete means not only for increasing production of food and energy resources but also at the same time for absorbing solar heat and reducing carbon dioxide gas in the atmosphere which anyone can do for sure.

For example, from the photosynthesis of sweet potato, 264 g of carbon dioxide gas and 688 kcal of solar heat are absorbed and 1180 g of glucose sugar (carbohydrates) are produced. Carbohydrates (glucose sugar, starch and the like) are important nutritive substances to mankind and animals and are harvested as solid resources fixed as crops.

There has been known a containerized culture as a means for cultivating plants to produce the nutritive crop plants. The containerized culture is a useful means for cultivation of plants which has been done through ages and can be compactly managed.

However, technology and equipment used in present containerized culture are used only to an extent for farmer's raising seeding and for amateurs hobby gardening and hence they do not fulfill high productive function as full scale agricultural equipment.

Accordingly, there has been sought a device for fixing biomass-based solar heat and carbon dioxide gas with a similarity to containerized culture having high productivity of crops, which is capable of fixing carbon dioxide gas at high efficiency while being compact and easily managed.

Further, to solve the food crisis problem which is recently of concern on an individual level, so-called self-sufficient life in which people produce and consume most of the necessary food by themselves has been focused while becoming likely.

However, there is a problem that although deep in the mountains or in under-populated residential areas where people can acquire wide cultivating space, they can easily enjoy self-sufficient life, but in the residential areas and urban areas where they consume a great deal of food, they cannot realize self-sufficient life.

It is an object of the present invention to provide a device for fixing biomass-based solar heat and carbon dioxide gas and a house equipped with the same fixing device having an energy circulation system which can solve the above mentioned issues.

To achieve the above-mentioned object, according to a first aspect of the present invention, there is provided a device for fixing biomass-based solar heat and carbon dioxide gas which includes an air intake unit which is configured to take air into a box, a mesh-like air and water flow-through unit laid in the bottom of the box which is configured to be open to the atmosphere, a water reservoir tray on which the box is mounted and cultivating soil that is held inside the box.

Furthermore, the device for fixing biomass-based solar heat and carbon dioxide gas is characterized in that the air intake unit is formed of a mesh cylindrical body which is buried in the cultivating soil and upper part of which is exposed to the atmosphere.

Furthermore, the device for fixing biomass-based solar heat and carbon dioxide gas is characterized in that the air intake unit includes air pores formed on a side wall of the box.

Furthermore, the device for fixing biomass-based solar heat and carbon dioxide gas is characterized in that the air and water flow-through unit is formed by holding a porous body inside a mesh-like container through which air and water can pass.

Furthermore, the device for fixing biomass-based solar heat and carbon dioxide gas is characterized in that the porous body is a mixture of activated carbon, foamed ceramics, and ion-exchange resin and by being arranged in a state that the porous body sticks out from a surface of the water which is retained in the water reservoir tray, the porous body ionizes water contacting the porous body and increases ion concentration in the air in the vicinity of a water surface and ion concentration in the cultivating soil through this water.

Furthermore, the device for fixing biomass-based solar heat and carbon dioxide gas is characterized in that the water reservoir tray includes a water level adjustment unit which is configured to adjust a level of the water retained inside the water reservoir tray.

According to a second aspect of the present invention, there is provided a house equipped with the device for fixing biomass-based solar heat and carbon dioxide gas which is characterized in that the device for fixing biomass-based solar heat and carbon dioxide gas is arranged in an area that gets a lot of sunshine.

Furthermore, the house equipped with the device for fixing biomass-based solar heat and carbon dioxide gas is characterized by being equipped with a bio auxiliary equipment necessary for operating the device for fixing biomass-based solar heat and carbon dioxide gas.

Furthermore, the house equipped with the device for fixing biomass-based solar heat and carbon dioxide gas is characterized in that the bio auxiliary equipment is constituted of a biomass concentrated incubator and a bio generator which generates electricity by using microorganism incubated in the biomass concentrated incubator through solar heat.

Furthermore, the house equipped with the device for fixing biomass-based solar heat and carbon dioxide gas is characterized in that the biomass concentrated incubator includes a storage tank which is formed of a member having a light-blocking property and is configured to cause living plant biomass in liquid mixed with plant biomass and water to make the dark reaction of photosynthesis, and a biomass proliferation pipe which is formed of a pipe having a translucent property and is configured, in the course of flowing the liquid retained in the storage tank, to cause the living plant biomass contained in the liquid to make the light reaction of photosynthesis and to proliferate, and the biomass proliferation pipe includes an outward passage which is configured to soak up the liquid retained in the storage tank by capillary action, and a return passage which is communicated and connected with the outward passage and has a shape where a capillary force does not work with respect to the outward passage, and is configured to flow down the liquid, specific gravity of which becomes heavy due to photosynthesis in the course of soaking up in the outward passage, into the storage tank.

Furthermore, the house equipped with the device for fixing biomass-based solar heat and carbon dioxide gas is characterized in that the bio generator includes an evaporation unit which is configured to heat and instantly evaporate the mixed liquid of plant biomass obtained from the biomass concentrated incubator and water and to make the mixed liquid into an ionized plasma state, a temperature difference power generation unit which is configured to generate electricity by temperature difference between the temperature of the evaporation unit and the temperature in the atmosphere, an electromagnetic fluid power generation unit which is configured to generate electric power between the electrodes by passing the plasma between a pair of electrodes arranged in a magnetic field, a turbine generator unit which is configured to rotate a turbine with the use of pressure of gas flow of the plasma and to generate electricity, a gas reforming unit which is configured to adjust temperature of the gas flow and to increase concentration of hydrogen gas in the gas flow, a preparative separation unit which is configured to separate hydrogen and carbon dioxide from the gas flow, and a fuel cell power generation unit which is configured to supply the hydrogen separated from the gas flow by the preparative separation unit and oxygen in the atmosphere to a fuel cell and to generate electricity, and furthermore, the bio generator is configured to supply the carbon dioxide separated from the gas flow by the preparative separation unit to biomass in the biomass concentrated incubator and to reproduce the plant biomass.

According to a first aspect of the present invention, there is provided a device for fixing biomass-based solar heat and carbon dioxide gas which includes an air intake unit which takes air into a box, a mesh-like air and water flow-through unit laid in the bottom of the box which is configured to be open to the atmosphere, a water reservoir tray on which the box is mounted, and cultivation soil which is held in the box. Therefore, the fixing device can fix solar heat and carbon dioxide gas efficiently and nurture biomass growing effectively.

Further, in the device for fixing biomass-based solar heat and carbon dioxide gas, the air intake unit is configured to be formed of a mesh cylindrical body which is buried in the cultivating soil and upper part of which is exposed to the atmosphere. Therefore, the fixing device can supply air into the cultivating soil efficiently, activate biomass, and advance biomass growing.

Further, in the device for fixing biomass-based solar heat and carbon dioxide gas, the air intake unit is configured to include air pores formed on a side wall of the box. Therefore, the fixing device can supply air into the soil, activate biomass and advance biomass growing.

Further, in the device for fixing biomass-based solar heat and carbon dioxide gas, the air and water flow-through unit is configured to be formed to hold a porous body inside the mesh-like container through which air and water can pass. Therefore, the fixing device can efficiently supply oxygen and water into the vicinity of the root portion of the biomass without blocking air and water flow, and make the water in the water reservoir tray to be suited to biomass.

Further, in the device for fixing biomass-based solar heat and carbon dioxide gas, the porous body is a mixture of active carbon, foamed ceramics and ion-exchange resin and by being arranged in a state that the porous body sticks out from a surface of the water retained in the water reservoir tray, the porous body ionizes water contacting the porous body and increases ion concentration in the air in the vicinity of a water surface and ion concentration in the cultivating soil through this water. Therefore, the fixing device can supply the biomass with ionized water, air, and nutrients having a conducive effect to the growth of the biomass.

Further, in the device for fixing biomass-based solar heat and carbon dioxide gas, the water reservoir tray includes a water level adjustment unit which is configured to adjust a level of the water retained inside the water reservoir tray. Therefore, the fixing device can change supply amount of water to the biomass properly and also adjust an amount of production of the ionized substance generated by the air and water flow-through unit.

According to a second aspect of the present invention, there is provided a house equipped with the fixing device in which the device for fixing biomass-based solar heat and carbon dioxide gas is arranged in an area that gets a lot of sunshine. Therefore, the whole house becomes a plant garden and can make persons living in the house enjoy plant educational effect caused by the device for fixing biomass-based solar heat and carbon dioxide gas.

Further, in the house equipped with the fixing device, the house equipped with the fixing device includes a bio auxiliary equipment necessary for operating the device for fixing biomass-based solar heat and carbon dioxide gas. Therefore, the house equipped with the fixing device can operate the device for fixing biomass-based solar heat and carbon dioxide gas more effectively. Moreover, the house equipped with the fixing device can make the house itself function as a device for fixing solar heat and carbon dioxide gas.

Further, in the house equipped with the fixing device, the bio auxiliary equipment is configured to be constituted of a biomass concentrated incubator and a bio generator which generates electricity by using microorganism incubated in the biomass concentrated incubator through solar heat. Therefore, the bio auxiliary equipment can supply electricity to the house while suppressing loads to the environment as much as possible.

Further, in the house equipped with the fixing device, the biomass concentrated incubator includes a storage tank which is formed of a member having a light-blocking property and is configured to cause living plant biomass in liquid mixed with plant biomass and water to make the dark reaction of photosynthesis, and a biomass proliferation pipe which is formed of a pipe having a translucent property and is configured, in the course of flowing the liquid retained in the storage tank, to cause the living plant biomass contained in the liquid to make the light reaction of photosynthesis and to proliferate, and the biomass proliferation pipe includes an outward passage which is configured to soak up the liquid retained in the storage tank by capillary action, and a return passage which is communicated and connected with the outward passage and has a shape where a capillary force does not work with respect to the outward passage, and is configured to flow down the liquid, specific gravity of which becomes heavy due to photosynthesis in the course of soaking up in the outward passage, into the storage tank. Therefore, the house equipped with the fixing device can incubate plant biomass efficiently while suppressing energy consumption.

Furthermore, in the house equipped with the device for fixing biomass-based solar heat and carbon dioxide gas, the bio generator includes an evaporation unit which is configured to heat and instantly evaporate the mixed liquid of plant biomass obtained from the biomass concentrated incubator and water and to make the mixed liquid into an ionized plasma state, a temperature difference power generation unit which is configured to generate electricity by temperature difference between the temperature of the evaporation unit and the temperature in the atmosphere, an electromagnetic fluid power generation unit which is configured to generate electric power between the electrodes by passing the plasma between a pair of electrodes arranged in a magnetic field, a turbine generator unit which is configured to rotate a turbine with the use of pressure of gas flow of the plasma and to generate electricity, a gas reforming unit which is configured to adjust temperature of the gas flow and to increase concentration of hydrogen gas in the gas flow, a preparative separation unit which is configured to separate hydrogen and carbon dioxide from the gas flow, and a fuel cell power generation unit which is configured to supply the hydrogen separated from the gas flow by the preparative separation unit and oxygen in the atmosphere to a fuel cell and to generate electricity, and furthermore, the bio generator is configured to supply the carbon dioxide separated from the gas flow by the preparative separation unit to biomass in the biomass concentrated incubator and to reproduce the plant biomass. Therefore, the house equipped with the fixing device can generate electricity efficiently in multiple stages and yet can sustain plant biomass incubation continuously while nurturing plant biomass incubation.

DETAILED DESCRIPTION OF THE INVENTION

Hereinafter, a device for fixing biomass-based solar heat and carbon dioxide gas and a house equipped with the same fixing device according to the present embodiment are explained with reference to drawings. To facilitate understanding of the explanations, firstly, the device for fixing biomass-based solar heat and carbon dioxide gas is explained in detail and next, the house equipped with the fixing device is explained in detail.

[Device for Fixing Biomass-Based Solar Heat and Carbon Dioxide Gas]

Figure 1:
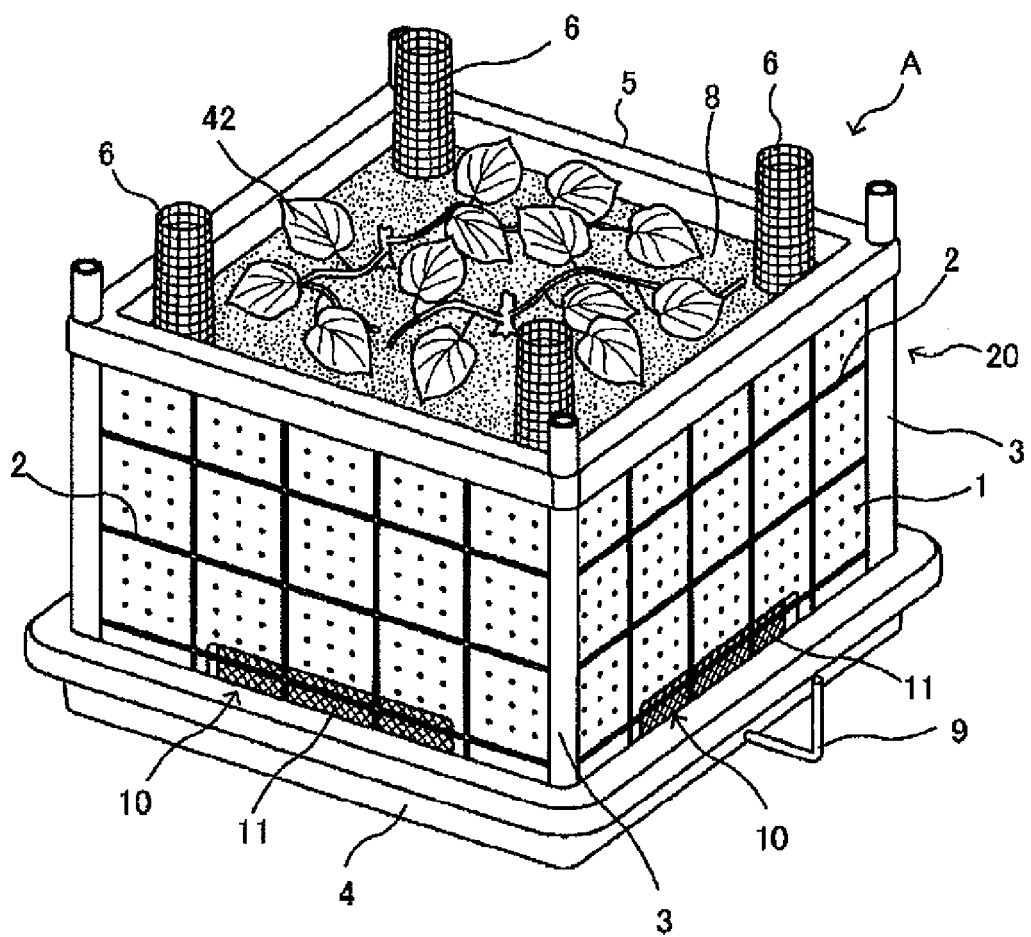
FIG. 1 is an oblique perspective view showing a whole constitution of a fixing device according to the present embodiment.
Figure 3A:
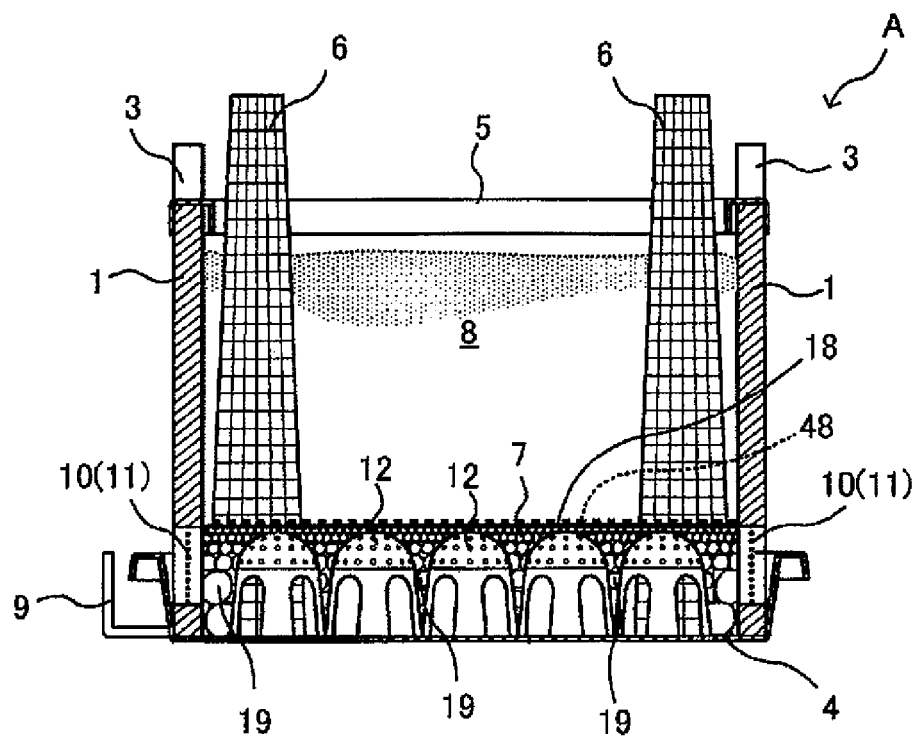
FIG. 3 is an explanatory view showing an internal constitution of the fixing device according to the present embodiment.
Figure 3B:
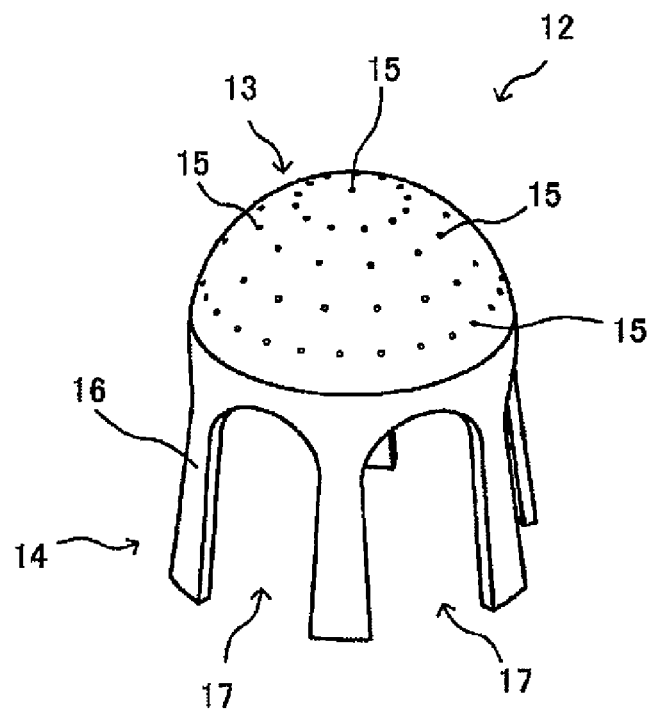
Figure 4:
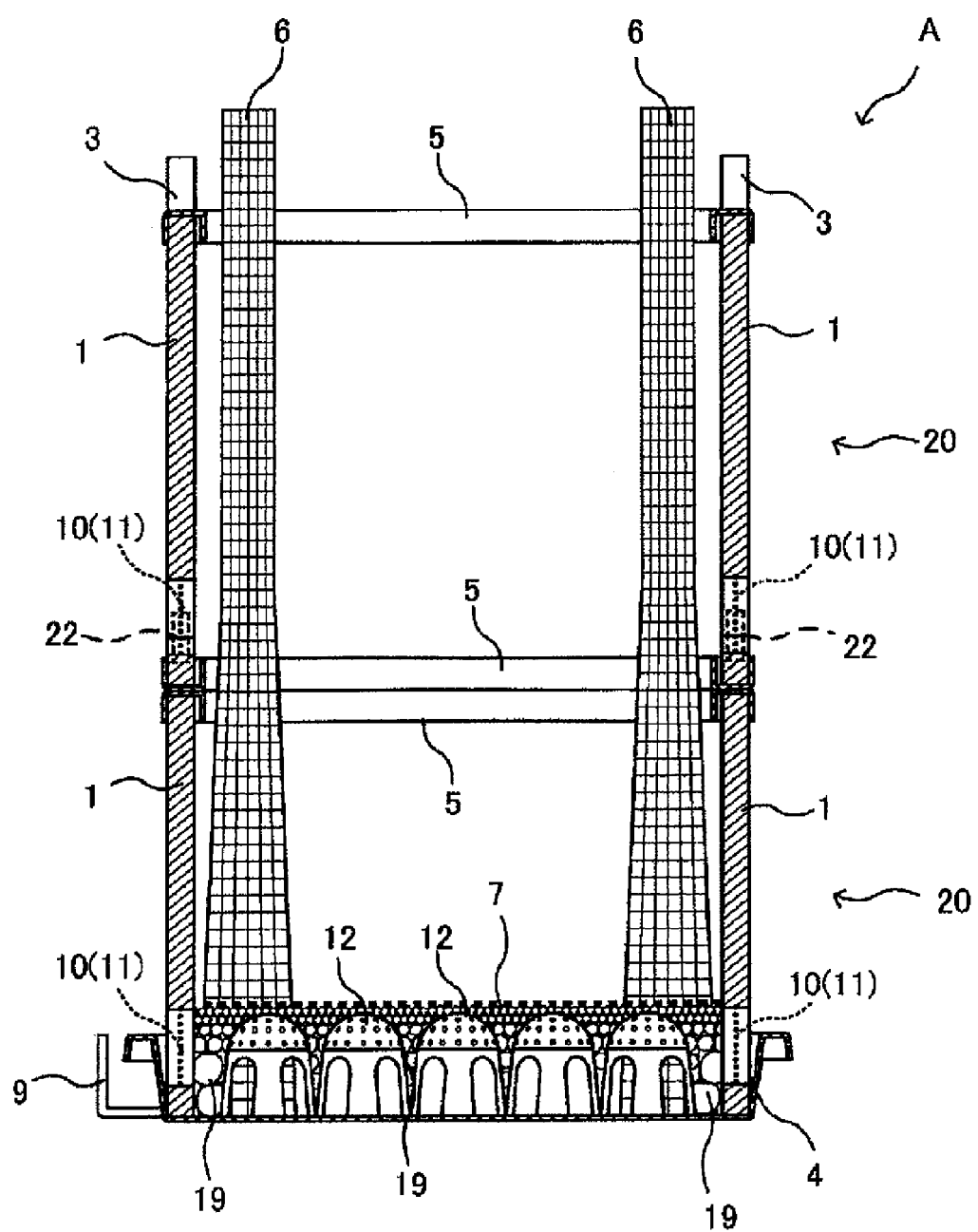
FIG. 4 is an explanatory view showing an internal constitution of the fixing device according to the present embodiment.
Figure 5A:
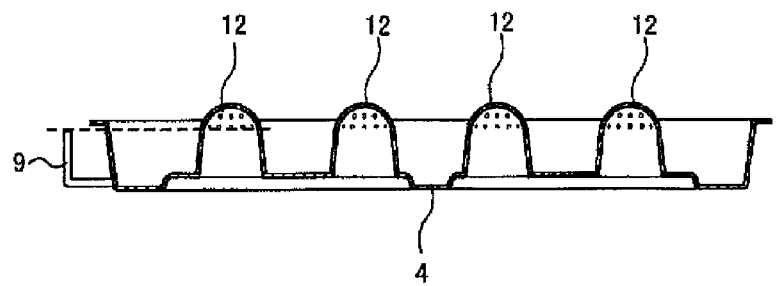
FIG. 5 is an explanatory view showing an example of modification of a water reservoir tray.
Figure 5B:
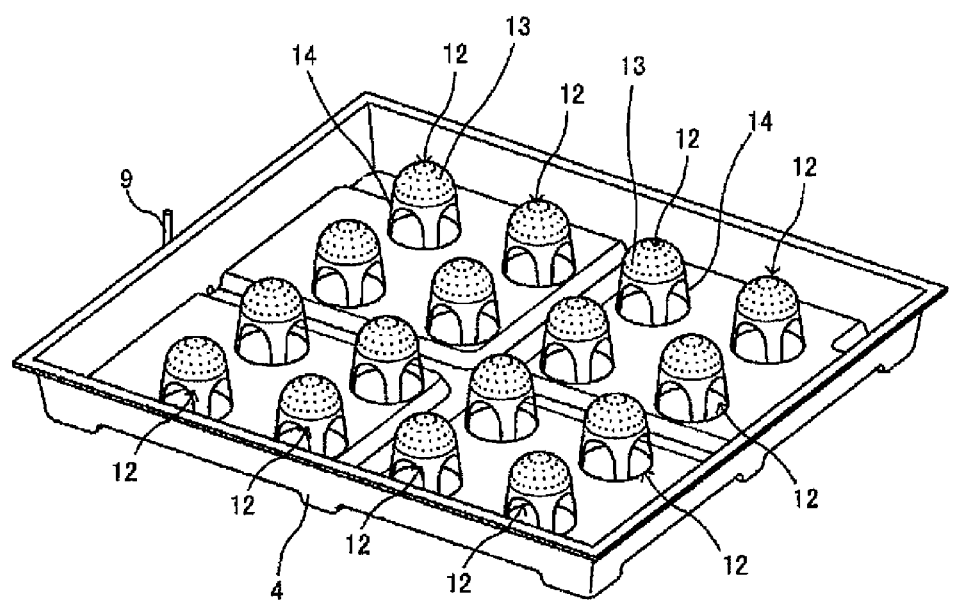

FIGS. 1 to 3 are explanatory views of a device for fixing biomass-based solar heat and carbon dioxide gas (hereinafter, referred simply to as "fixing device") A according to the present embodiment, FIG. 4 is an explanatory view showing a state in which a plurality of the fixing devices A are combined, and FIG. 5 is an explanatory view showing a construction of a water reservoir tray 4 according to the present embodiment with which a portion of the ventilating opening of a biomass cultivation equipment is incorporated.

The fixing device A shown in FIGS. 1 to 3 functions as an assembly-variable biomass (plant matter) cultivation equipment which can manage various kinds of cultivation conditions.

Here, though biomass cultivated for fixing solar heat and carbon dioxide gas is not particularly limited, on or in cultivation soil 8 held in the fixing device A, vegetables, fruit vegetables, root vegetables, and potatoes can be cultivated, for example.

In FIG. 1, a symbol 1 is an external wall material which constitutes external wall of the fixing device A. The external wall material 1 is formed of foamed material such as foamed ceramics, foamed plastics or the like. The inside of foamed material may be so-called usual foamed polystyrene in which foamed bubbles are not communicated with each other, and also may be constituted of foamed ceramics and foamed plastics which have a state where gaps of bubbles are connected with each other, hard sponge or the like. By forming the external wall material 1 with these materials, it is possible for the external wall material 1 to have properties of aeration, water retention and moisture retention.

Further, at the lower part of the erected external wall material 1, flow holes 10 which is configured to take retained water in the water reservoir tray 4 described later and air is formed, and in the flow hole 10, a net 11 is arranged to prevent leakage of soil and components of disposition contained in the soil and also to prevent invasion of worms and garbage.

Further, a symbol 2 shown in FIG. 1 is a reinforcing latticework which fixes the external wall material 1 and resists soil pressure of cultivating soil 8 held inside of the external wall material 1. Moreover, in the four corners of the external wall materials 1 which are erected on the four sides, supporting post pipes 3 which extend vertically and have cylindrical shape are arranged. The supporting post pipe 3 functions as a reinforcing member of the external wall material 1 and as explained later with reference to FIG. 4, the supporting post pipe 3 also functions as a supporting post which, when box parts 20 are stacked, fixes the box parts by insertion. In addition, the supporting post pipe 3 can be used as a supporting post which supports stems and fruits of grown biomass and also can be used as a supporting post of a net for the prevention of worms, birds, and beasts.

Particularly, in the case where root vegetables and potatoes which develop rhizome are grown as biomass, by stacking up frame-like and bottom-less fixing devices on the fixing device in this way, so as to make the bottom deep, it is possible to fix more solar heat and carbon dioxide gas without impeding the growing in the soil.

Turning back to FIGS. 1 to 3, the integrated box part 20 having a bottomless rectangular cylinder shape is formed by fitting a fixing frame 5 with a shape of approximate "U" toppled over sideways on a cross-sectional view from the upper part of the external wall material 1 erected in four directions, the reinforcing latticework 2 arranged along the external wall material 1, and the supporting post pipe 3 arranged in the four corners of the external wall material 1.

Figure 2A:
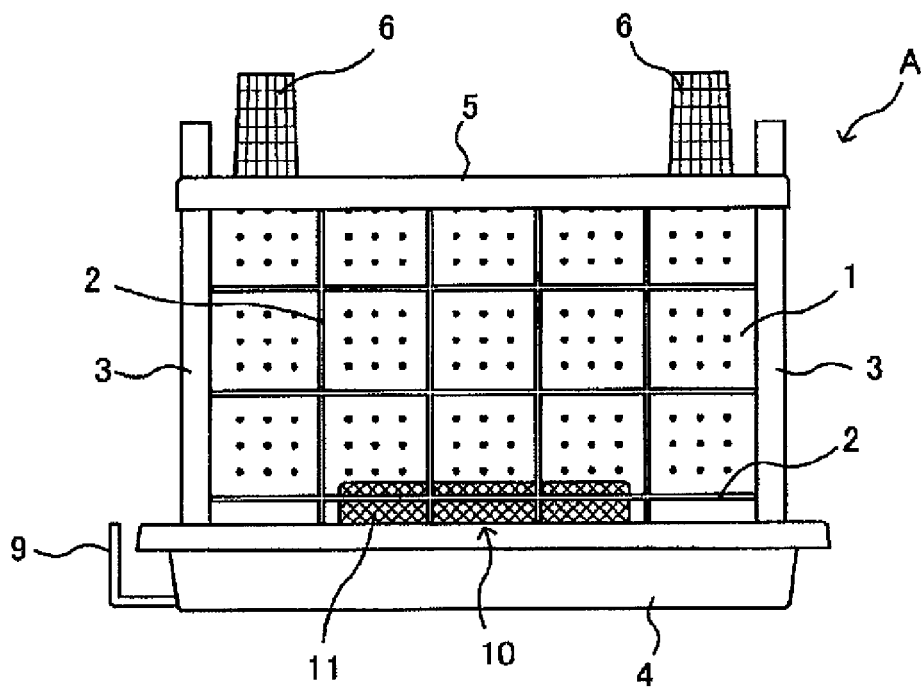
FIG. 2 is an explanatory view showing a whole constitution of the fixing device according to the present embodiment.

And, the fixing device A is constituted by arranging this box part 20 on the water reservoir tray 4 which receives this box part 20. The water reservoir tray 4 functions as a storage tank which retains water necessary for plants. On the side part of the water reservoir tray 4, as shown in FIG. 2A, a drain 9 for adjusting water level by discharging extra water is provided.

The drain 9 is constituted by inserting the root part of a hollow pipe with an approximate "L" shape on a side view into the inside of the water reservoir tray 4 and is configured, when higher level of water than a height of erected tip opening part of the drain 9 is retained in the water reservoir tray 4, to pass water and enable to discharge the water from the tip opening part to the outside.

Further, the root part of the drain 9 is rotatably formed, and the drain 9 is configured to enable to adjust an amount of water retained in the water reservoir tray 4 by moving the tip opening part of the drain 9 in circular arc. That is, the drain 9 functions as a water level adjustment unit to adjust a level of water retained in the water reservoir tray 4.

A symbol 6 is an aeration passage as an air intake unit installed on the water reservoir tray 4 (pallet). The wall surface (circumferential face) of the aeration passage 6 is made of material which induces ion exchange or ion production, such as, active carbon, ceramics having an ion-exchange property, ion-exchange resin, germanium, tourmanium and the like, and the aeration passage is a wall body in which, passing water and gas are ionized, enhancing life force. That is to say, the aeration passage is an active form the material of which has electrical characteristic that absorbs and desorbs positive and negative ions, and performs ion exchange of the inside of the box and adjusts pH of growing environment of biomass.

Figure 2B:
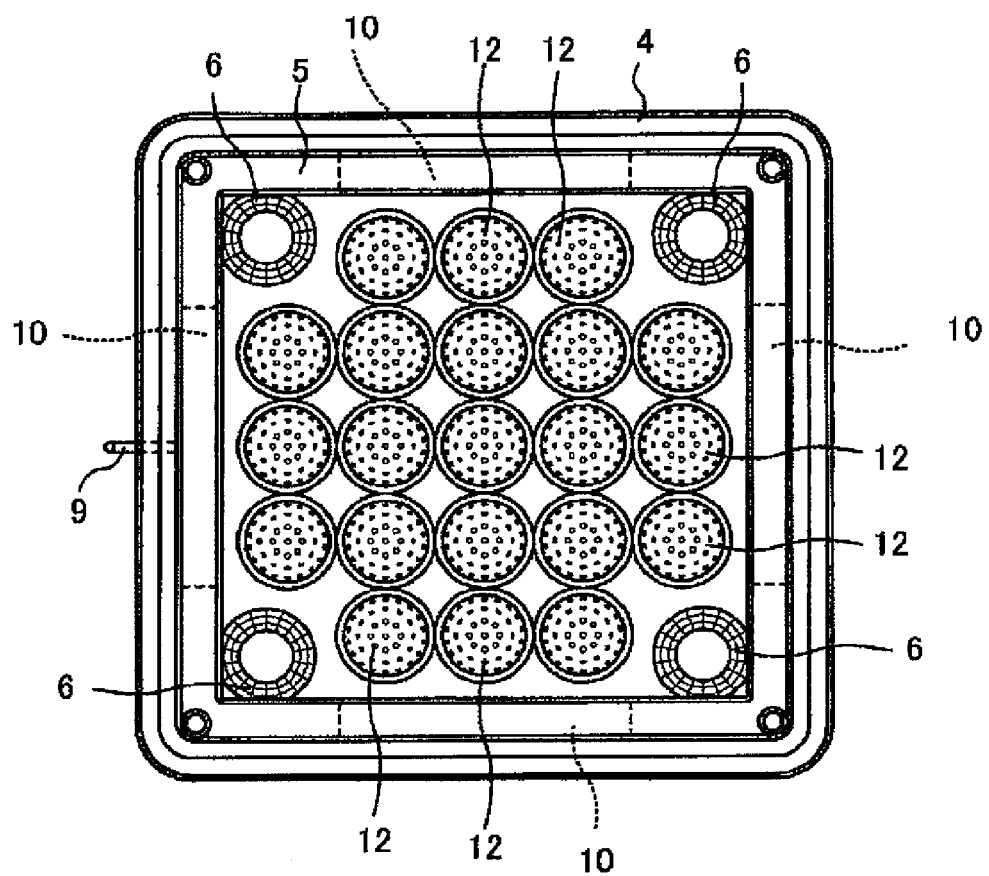

The aeration passage 6, as shown in FIG. 2B and FIG. 3A, is arranged in a state that the aeration passage 6 is erected from the bottom part of the water reservoir tray 4 and passes through the cultivating soil 8 is open to the atmosphere. Due to such a constitution, it is possible to form space on the surface of the water which is retained in the water reservoir tray 4 and in the soil to supply or discharge the water and the soil with oxygen, nitrogen, carbon dioxide gas and the like in the atmosphere (in the air) through the space.

Further, the aeration passage 6 can also be used as a slot of water, fertilizer, activator, oxygen adjuster, disinfectant and the like, and it is possible to improve usefulness in the case of growing biomass and to further accelerate fixing of solar heat and carbon dioxide gas. Here, the number of the aeration passages 6 installed in the fixing device A can be changed appropriately depending on the kinds of plants.

Further, on the water reservoir tray 4, an aeration cup 12 as an air and water flow-through unit which entirely diffuses air taken from the aeration passage 6 and constitutes a subject of ion exchange and ion generation is arranged (See FIG. 3B). The aeration cup 12 is formed in a shape of an approximate hanging bell in appearance and on a upper half part 13 formed in a hollow-hemisphere shape, a plurality of small pores 15 having the size as small as the soil does not fall clown are formed, and in the lower half part 14 which extends downward from the hemisphere edges of the upper half part 13, cut-off parts 17 having an oblong shape are formed in the portion of wall surfaces 16. Here, it is needless to say that the upper half part 13 and lower half part 14 may be formed in different bodies and incorporated, or may be constituted in an integrated fashion using one mold and the like.

A plurality of the aeration cups 12 are, as shown in FIG. 2B, arranged in the water reservoir tray 4 densely in an orderly fashion and further above the aeration cups 12, 12, . . . a gravel base layer 7 which fills up gaps of the aeration cups 12 and aeration passage 6 and has a hygroscopic aeration property for the purpose of continuity of air and water supply to the soil laid above is formed. Here, the aeration cup 12 is provided in different body from the water reservoir tray 4, however, as shown in FIG. 5, water reservoir tray 4 and the aeration cup 12 may be formed in an integrated fashion using predetermined mold and the like.

The gravel base layer 7 is piled up with coarse gravels (grain diameter is large) in the bottom and gradually fine gravels (grain diameter is small) to upwards, up to a position slightly higher than a level of water retained in the water reservoir tray 4. The gravel base layer 7 is laid in order from coarse to fine gravels from the bottom so that the gravel base layer 7 forms an appropriate continuous space and hence, a soil base having, as a whole, well-balanced properties in aeration, drainage, and retention of water is formed Further, in an upper layer than the gravel base layer 7, a root prevention sheet 18 having dense mesh is laid, and in a far upper layer, a mesh-like soil leakage prevention net 48 is laid.

The root prevention sheet 18 is a sheet for preventing the roots of biomass planted in the cultivation soil 8 from extending into the gravel base layer 7 and may be a sheet which has a mesh size to an extent that flow of air and water is possible, and yet, roots of biomass cannot pass through.

Further, the soil leakage prevention net 48 is a net for preventing the cultivating soil from flowing downwards and preventing the cultivating soil 8 from contacting directly to the root prevention sheet 18 and may be a sheet having a mesh size to an extent that particles in the cultivating soil 8 cannot pass through.

Further, in a lower layer than the gravel base layer 7, and in the vicinity of the lower half part 14 of the aeration cup 12, an granular and porous ion-exchange body 19 is arranged. The ion-exchange body may be made of, for example, active carbon, bamboo charcoal, bincho charcoal, pumice and the like. To be described later in detail, the ion-exchange body 19 plays a role of increasing ion concentration in the retained water and nurturing the growing of biomass, by retained water in the water reservoir tray 4 and outside air which flow from a flow-through opening 10 to the inside contacting the ion-exchange body 19.

The aeration passage 6, and the aeration cup 12 form a space to which 3 interfaces made of air, ground water, and soil contact. In this space, ground water and soil breed bacteria in the soil, by constantly receiving supply of moderate oxygen and ionized water, and prevent putrefactive bacteria from proliferating. Proliferation of useful bacteria activates a power of soil which constitutes culture media, accelerates growing of plant roots, and grows vibrant plant body having strong life force and high crop productivity.

Particularly, the water stored in the water reservoir tray 4, dissolves substance in the cultivating soil 8 and becomes colloidal solution in which dissolved substances are ionized, by means of the aeration cup 12 as a flow-through unit of air and water which constitute a subject of ion generation body.

That is, the water stored for several days in the water reservoir tray 4 has become colloidal ion solution containing nutritive components and the water like this has the similar function as culture fluid used for hydroponic culture. Therefore, roots of biomass, when reaching water surface of the colloidal solution, exhibit the similar growing as in hydroponic culture, by absorbing this water. Furthermore, the roots of biomass also proliferate in the cultivating soil 8, and absorb nutrition and minerals having far higher concentration than in water. That is, the present invention has both advantages of hydroponic culture and soil culture.

The 3 interfaces among the colloidal solution, the cultivating soil 8, and air become symbiotic environment where chain of life of protozoan organism including bacteria, plankton, living matter in the soil such as earthworm and living matter under water such as little fish is performed. The water in which excreted and secreted material of those living matters are mixed further forms eco-physiological colloidal solution necessary for symbiotic living of life. Due to this, the ionized water is easily absorbed in the living matter and governs environment necessary for growing of life, thus forming the autonomous biosphere.

Further, when above-mentioned eco-physiological colloidal solution is absorbed into biomass, organic and inorganic ion-exchange operation is performed and organic and inorganic exchange of substance (anabolic reaction) necessary for the growing of living body is accelerated. In other words, this ionic colloidal solution forms ion gradient in the outside world of cell which constitutes biomass, nurtures emission of sodium in Na—K pump of the cell into outside of the cell and transport of potassium to the inside of the cell, and prompts the growing of biomass. The ionic colloidal solution nurtures mutual transfer of sodium osmotic pressure and potassium osmotic pressure and prompts distribution inside of the body of biomass, thus accelerating the growing of biomass.

By the way, plants cultivated as biomass are separated into plants which comparatively prefer water and demand a great deal of water, and plants which do not prefer water depending on their kinds. Conventionally, this situation has been dealt with changing mode of cultivating land. Some crops need deep plowing. As to sunshine, some crops prefer strong sunshine and some crops prefer shade. The degree varies from plant to plant. Because the cultivating soil 8 in nature is heavy, cultivation work to make handling conditions requires a great deal of effort, intelligence, and patience.

According to the fixing device A, with the external wall material 1 and the reinforcing latticework 2 facing with each other and connecting long in 2 columns, by putting in the light-weight cultivating soil 8 improved to suit for culture, long and thin ridge-like cultivating land can be obtained without hard work. As shown in FIG. 4, a plurality of box parts 20 can be connected in the vertical direction to make deep soil and a plurality of box parts 20 can be arranged in the lateral direction to make well-cultivated wide and plain cultivating land. When crop plant is cultivated in units of packages in this way, many kinds of crop plants can be cultivated in the same place with narrow space simultaneously and cultivation method suited for each can be implemented in separate form.

Particularly, as shown in FIG. 4, by connecting the box parts 20 in the vertical direction to make the fixing device A, even in the case where root vegetables and potatoes are planted as biomass, it is possible to send enough air and ion to rhizomes, and to accelerate fixing of carbon dioxide gas as well as to nurture the growing of biomass. Here, a symbol 22 is a connecting piece for connecting the above and below supporting post pipe 3, 3.

Figure 12:
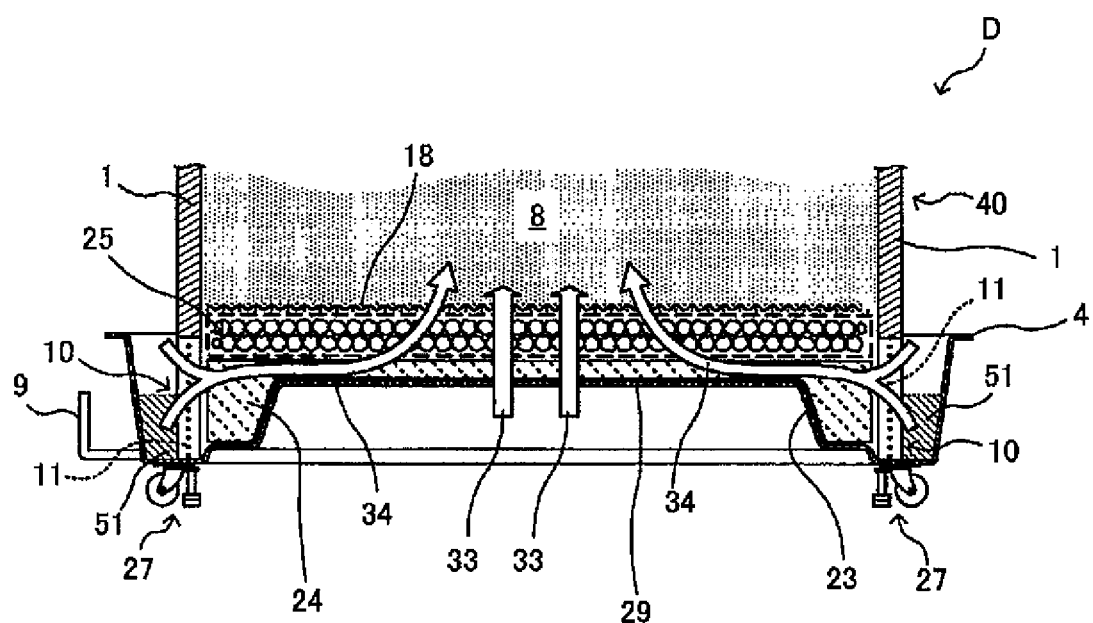
FIG. 12 is an explanatory view showing another example of modification of the water reservoir tray.

Plants vary in stock density and in amount of sunshine required depending on the degree of nurturing. Conventionally, it is impossible to move planted plants. This cultivation method allows a layout to be freely changed to accelerate the growing using casters as shown in FIG. 12, for example. Here, the casters are formed detachably to the water reservoir tray 4 and hence, mounting and dismounting the caster is possible as needed.

Particularly, an important thing is water. It is quite difficult to make a situation where natural water is stably supplied. General method of irrigation to complement this requires a great deal of facility costs.

If a specific signal which plants give is detected by a sensor, it is possible to automatically supply irrigation necessary for the plants just in time. Natural rainfalls can be accumulated and used, thus becoming economically water saving and resource saving.

In general, plants decay at the roots when too much water accumulates at the roots. It is because excess water blocks the air and causes a lack of oxygen thus weakening hairy roots and prompting proliferation of putrefactive bacteria in the surroundings. In the fixing device, due to the three-interface space of the aeration passage 6 and the aeration cup 12, oxygen and negative-ion water caused by antioxidant soil bacteria are constantly supplied to the soil and the roots so that it activates antioxidant action and does not cause root decay failure. Among bacteria in the cultivating soil 8, resuscitative bacteria group (useful bacteria) and putrefactive bacteria group are countervailing, and hence, when one group proliferates, the other group shrinks back. The roots of the plant and a group of resuscitative bacteria are in a codependent relationship in which they exchange their products and complement each other. The three-interface space in the aeration passage 6 and the aeration cup 12 provides an environment which accelerates this.

As a result, strong soil capabilities of the cultivating soil 8 develop there. The cultivating soil 8 can be used continuously for a long term by continuously cultivating crop plant which goes well with the soil. However, in general, it is necessary to break down the cultivation equipment and the cultivating soil 8 needs to be replaced. The old sediments are segregated into coarse gravel and fine soil by a sieve and got rid of undesired substance, disinfected by sun-bathing or exposure to a cold wind, and neutralized using lime. Moreover, organic material such as plant debris, garbage, oil meals, rice bran, rice hulls and the like and dust coal are plowed under the soil and made to ferment to resuscitate. The resuscitated cultivating soil 8 is mixed with new compost as fertilizer (compost) and is recycled to sustain strong soil capabilities.

Further, cultivating soil may be a mixture of granular body of foamed ceramics which sympathize with ion-exchange body in the base and react with ionization, granular body of plastics having a property of water absorption and water retention, or granular body of plant fiber with spontaneous soil such as natural soil, leaf soil or the like. Due to this, it is possible to efficiently ionize water retained in the water reservoir tray 4, thus further nurturing growth of biomass.

Further, when harvesting, since the box part 20 can be easily broken down, even in the case where root vegetables or potatoes are grown as biomass, it is characterized in that there is no need to make an effort to dig the soil. The cultivating soil 8 can be continuously used for a long term by continuously cultivating crop plant which goes well with the soil. However, since it is a small amount of soil, generally it is possible to recycle the soil by refreshing the soil in each case and by avoiding injury caused by continuous cropping. Accordingly, it makes a resource-saving and energy-saving agricultural method.

Second Embodiment

Next, second embodiment of a device for fixing biomass-based solar heat and carbon dioxide gas is explained with reference to FIG. 6. Here, in the following explanation, identical symbols are added to the similar constitution as the above mentioned fixing device A, and the explanation is omitted. Further, in FIG. 6, for convenience of explanation, the water reservoir tray 4 is omitted.

Figure 6:
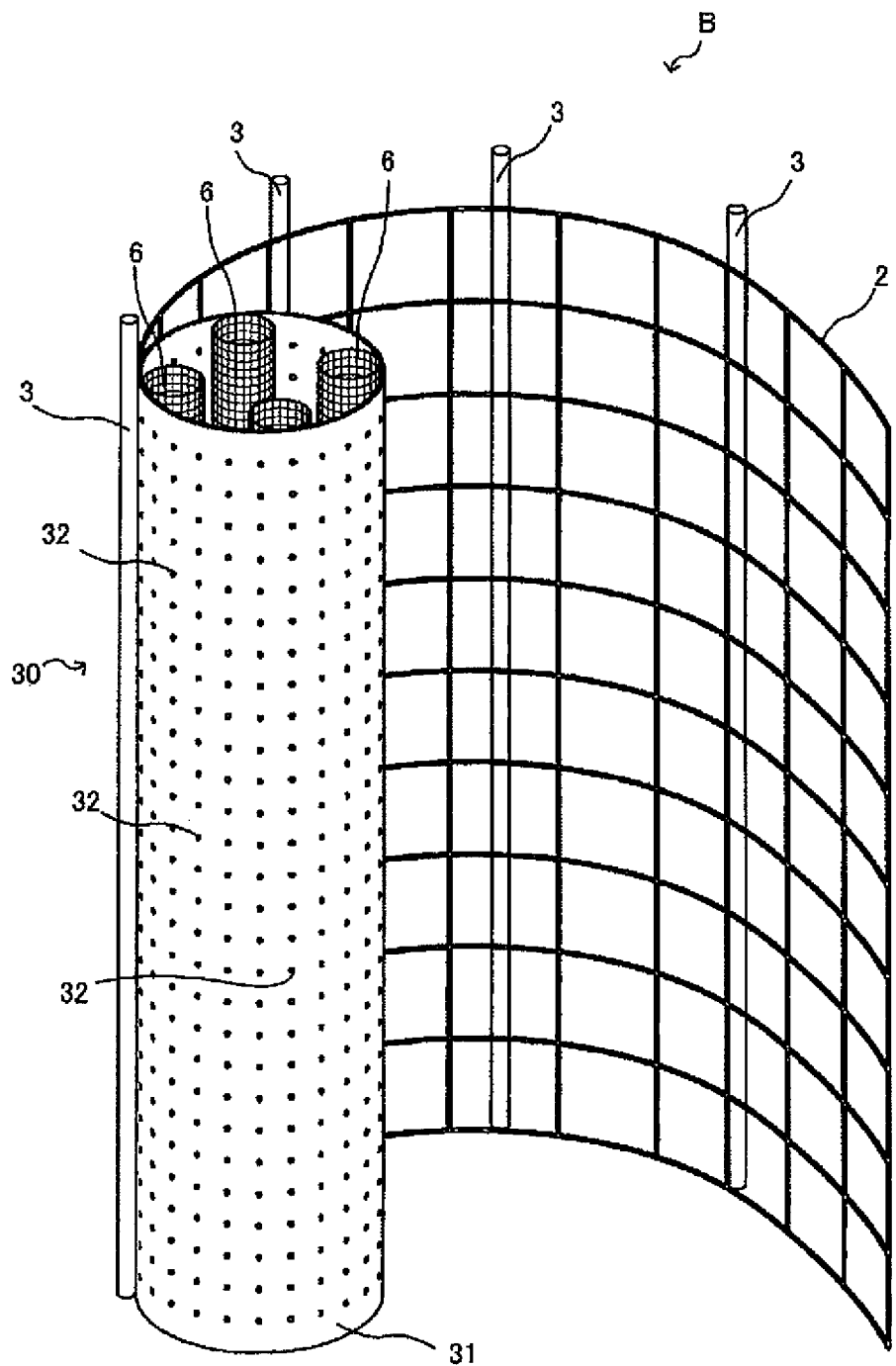
FIG. 6 is an exploded explanatory view showing a structure of a fixing device according to a second embodiment.

FIG. 6 is an exploded explanatory view showing a box part 30 of a fixing device B according to a second embodiment. As also shown in FIG. 6, the fixing device B, as compared with the fixing device A, differs in structure in a point that the fixing device B includes a cylindrical external wall material 31.

To be more specific, on the surface of the external wall material 31, a plurality of air pores 32 as an air intake unit is bored and is configured to efficiently supply air to the soil held in the inside of the external wall material 31.

In the conventional agricultural technology, in planting and cropping crop plants which require deep digging, a great deal of effort is required and hence, the planting or cropping is a hard work for the young and the old, however, by using the fixing device B, even the old and the young can easily cultivate deep root vegetables and harvest them without digging work.

Third Embodiment

Figure 7A:
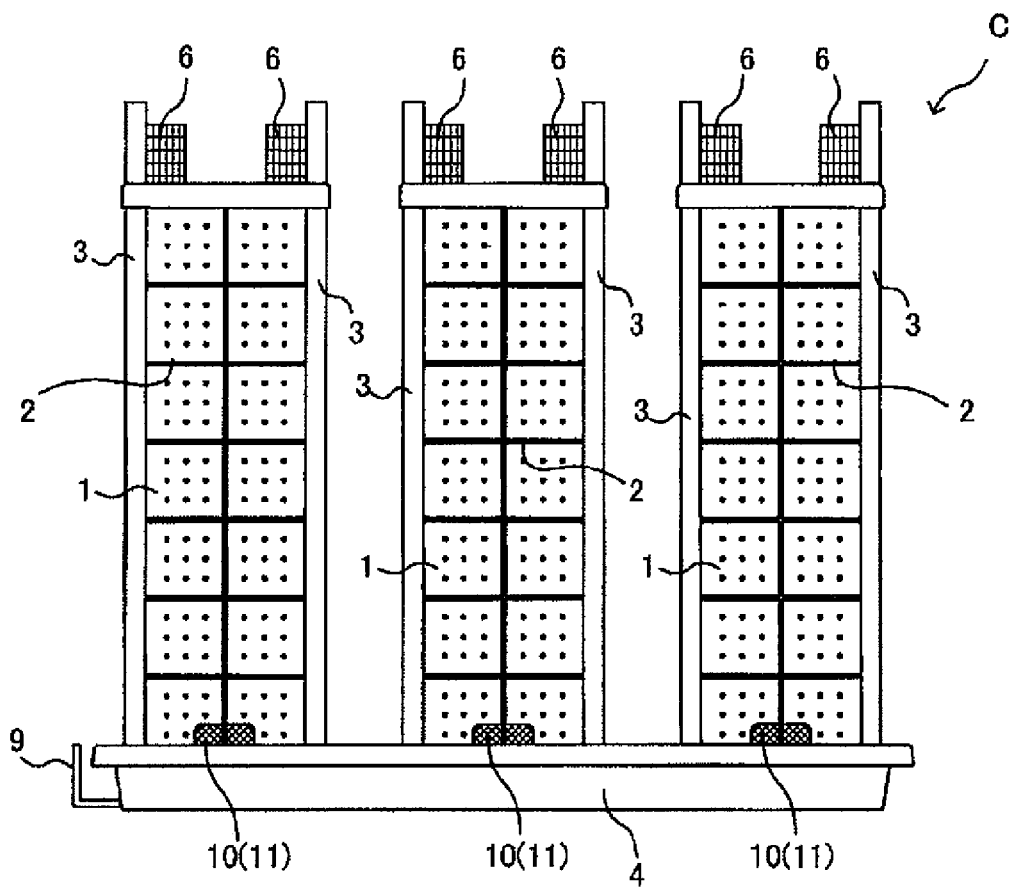
FIG. 7 is an explanatory view showing a constitution of a fixing device according to a third embodiment.
Figure 7B:
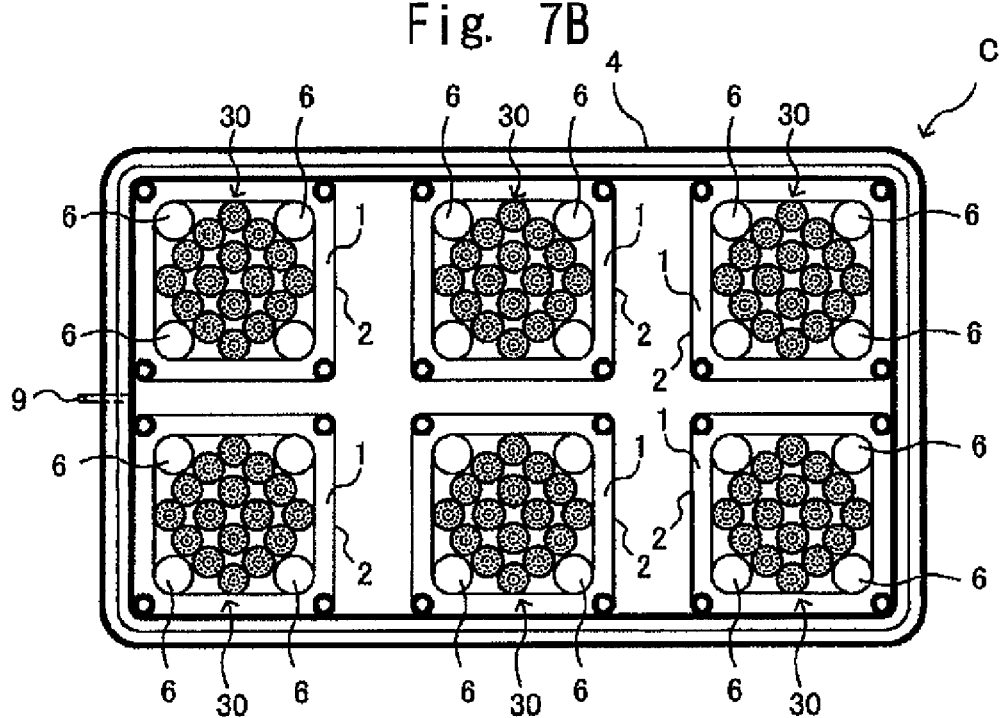

Next, a third embodiment of a device for fixing biomass-based solar heat and carbon dioxide gas is explained with reference to FIG. 7. FIG. 7 is an explanatory view of a fixing device C having an approximately rectangular shape on a plan view for using long root vegetables as biomass. The fixing device C differs in a structure in a point that a box part 30 is configured to have an approximately rectangular shape on a plan view as compared with the fixing device B in the above mentioned second embodiment which has an approximately circular shape on a plan view.

Further, the fixing device C is characterized in that a plurality of box parts 30 are arranged on one water reservoir tray 4.

Due to such a constitution, it is possible to give biomass planted in any one of the box parts 30 the same growing condition (water and ion concentration), thus enabling to grow most uniform possible biomass.

Further, an aeration passage 6 is formed of substance which sympathizes with electromagnetism, gives vital energy to the life force of all plants, provides a biomass cultivation technology and cultivation tool which allow anyone to cultivate in anywhere and have high productivity and improve productivity of agriculture and forestry. With the use of the technology and the tool, it is possible to improve photosynthesis capability of plants using the efficient cultivation tool, to convert a great deal of carbon dioxide gas into carbohydrates (food) using a great deal of plants, to improve production of food and biomass, and at the same time, to reduce carbon dioxide gas in the atmosphere in large amounts, to increase global resources, and to normalize even social environment.

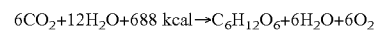
$$6CO_2 + 12H_2O + 688 \text{ kcal} \rightarrow C_6H_{12}O_6 + 6H_2O + 6O_2$$

This is a reaction formula of photosynthesis. Plant absorbs 264 g of carbon dioxide gas and 688 kcal, and produces 180 g of glucose (carbohydrates). Applying this to production of sweet potatoes, to crop approximately 7 kg of raw sweet potato, and to get "food" brings about reduction of approximately 10 kg (4500 liters) of $CO_2$ in the atmosphere, and furthermore, removes reflection of 700 kcal of solar heat into the air, thus killing three birds with one stone.

With the use of the fixing device C according to the third embodiment, it is possible to crop approximately 8 kg of sweet potatoes using approximately 50 $cm^3$ of cultivation equipment in approximately 70-day cultivation period. Furthermore, if the fixing device C is arranged with a compost box using the same box body, it is possible to form a greenhouse by using generated carbon dioxide gas and in-house-generated heat. In addition, since it is a mode in which cultivation management is possible in an industrialized method with man-power saving in package unit, triple cropping also becomes possible. Therefore, it is possible to get far higher productivity than conventional agricultural method. Cropped starch is fabricated into not only various kinds of fabricated foods but also medical products and industrial materials. Gasification with carbon and water makes fuel gas of high concentration and makes materials of various uses.

The biomass cultivated by the fixing device C is not limited to sweet potatoes. Cultivation of any kinds of plants is possible, and the biomass enhances the life force and improves the productivity of conventional agricultural method which is restricted by conventional natural conditions and working conditions. Anyone, in anywhere, can enjoy stable and far higher food production. Since it requires light work, it is possible for the old and the young to participate in the production, thus enabling to widely prevail at home. Due to this, wide spread of home garden significantly greens urban environment and resolves heat island phenomenon. Activation of photosynthesis power of plants makes carbon circulation in the natural environment dynamic and blocks the warming.

Fourth Embodiment

Figure 8:
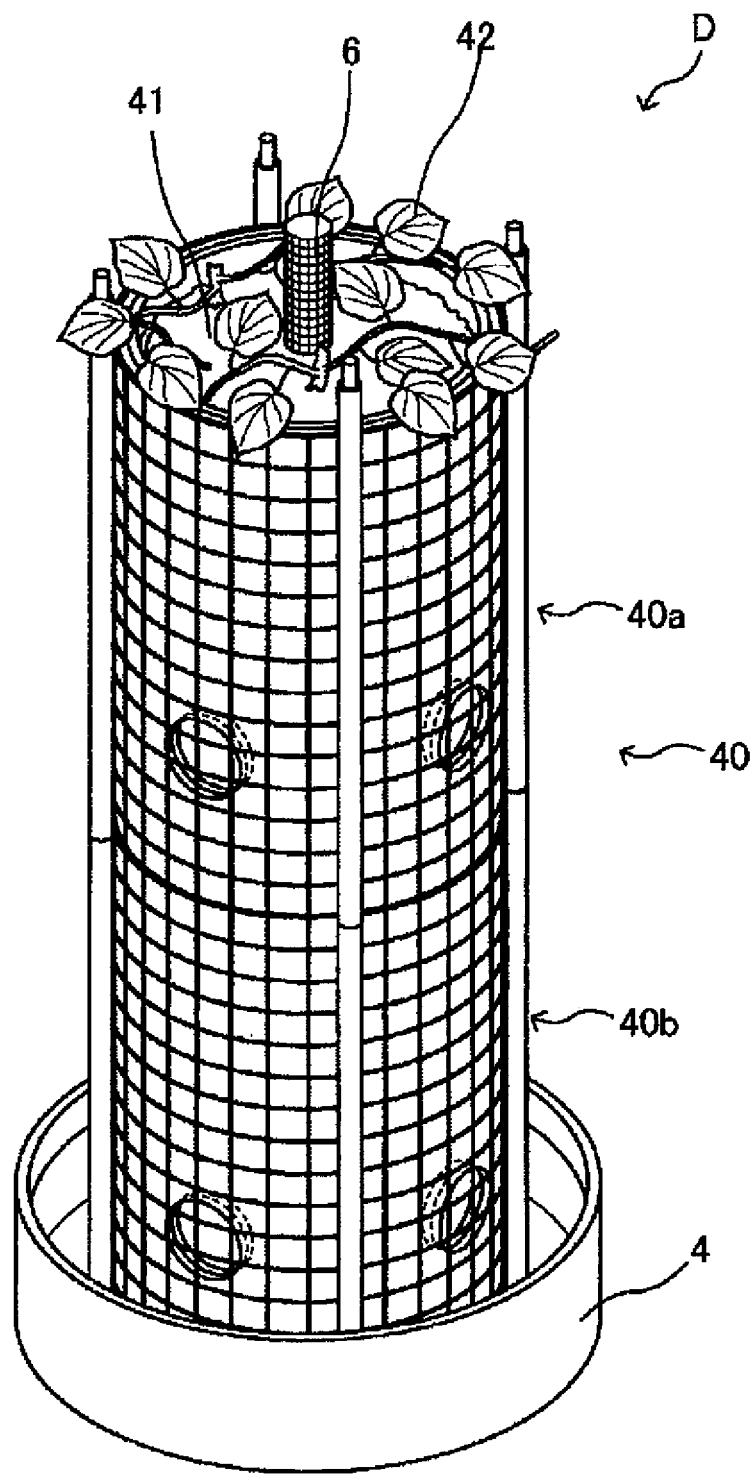
FIG. 8 is an oblique perspective view showing a whole constitution of a device according to a fourth embodiment.
Figure 9:
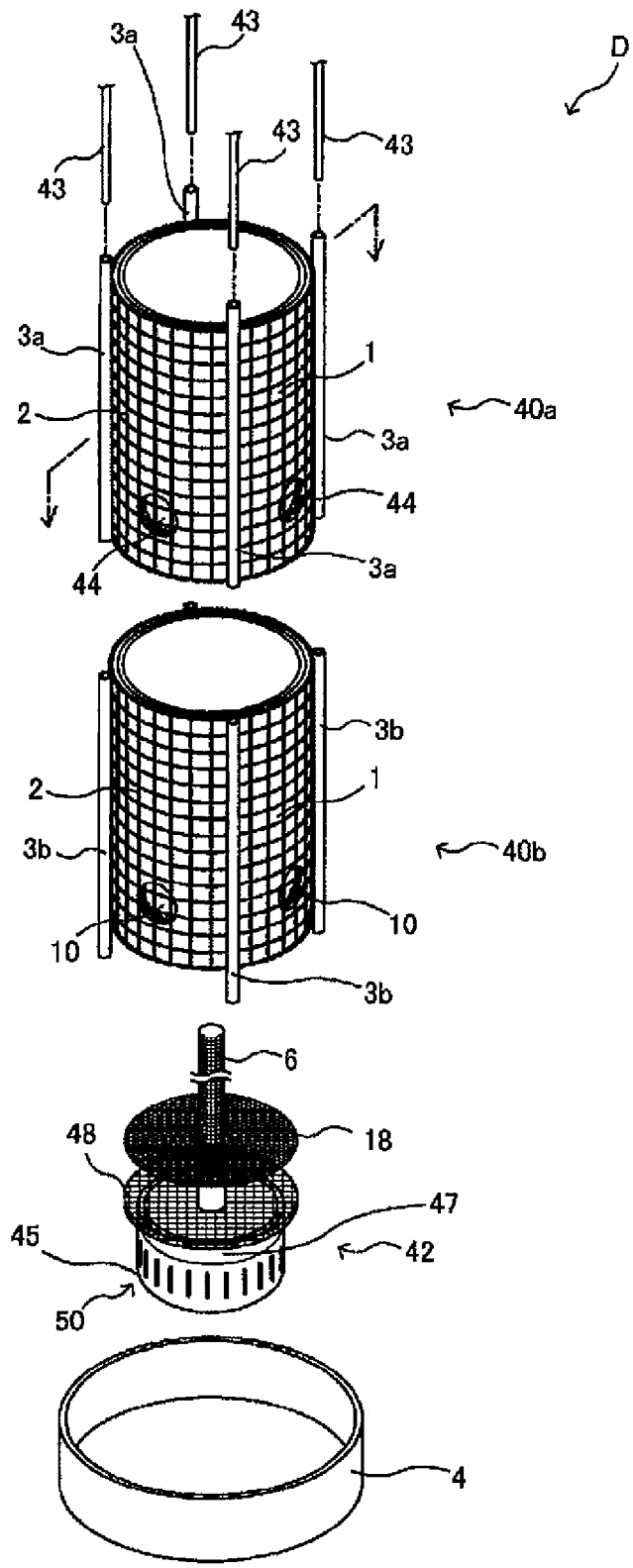
FIG. 9 is an exploded explanatory view showing a whole constitution of a fixing device according to the fourth embodiment.

Next, a fourth embodiment of a device for fixing biomass-based solar heat and carbon dioxide gas is explained with reference to FIGS. 8 to 10. FIG. 8 is an oblique perspective view showing an appearance of a fixing device D according to the fourth embodiment, FIG. 9 is an exploded explanatory view showing a constitution of the fixing device D, and FIG. 10 is an explanatory view on a cross-sectional view of the fixing device D.

As also shown in FIG. 8, the fixing device D according to the fourth embodiment, in an approximately similar way as the above-mentioned fixing device A and fixing device B, is constituted of a box part 40 and a water reservoir tray 4, and plants sweet potatoes 46 in a soil 41 held inside.

To be more specific, the fixing device D is configured to arrange a water purification equipment 42 as an air and water flow-through unit including an aeration passage 6 in the water reservoir tray 4 having a shape of circular cylinder with a bottom, and to arrange the box part 40 in such a way that the box parts 40 surround the water purification equipment 42. Further, the box parts 40 are configured to be arranged in a way that two vertically adjacent box parts 40a, 40b are stacked up.

Further, the box part 40 is configured to adjust a position so that 4 supporting post pipes mounted on a upper box part 40a, 3a, 3a, 3a, 3a and 4 supporting post pipes mounted on a lower box part 40b, 3b, 3b, 3b, 3b are communicated with each other, to insert connecting rods 43 into the supporting post pipe 3a and 3b respectively, and to fix upper and lower box parts 40a, 40b.

The upper box part 40a and the lower box part 40b have a similar constitution and include an external wall material 1, a reinforced latticework 2, and above-mentioned supporting post pipe 3a or 3b.

Figure 10A:
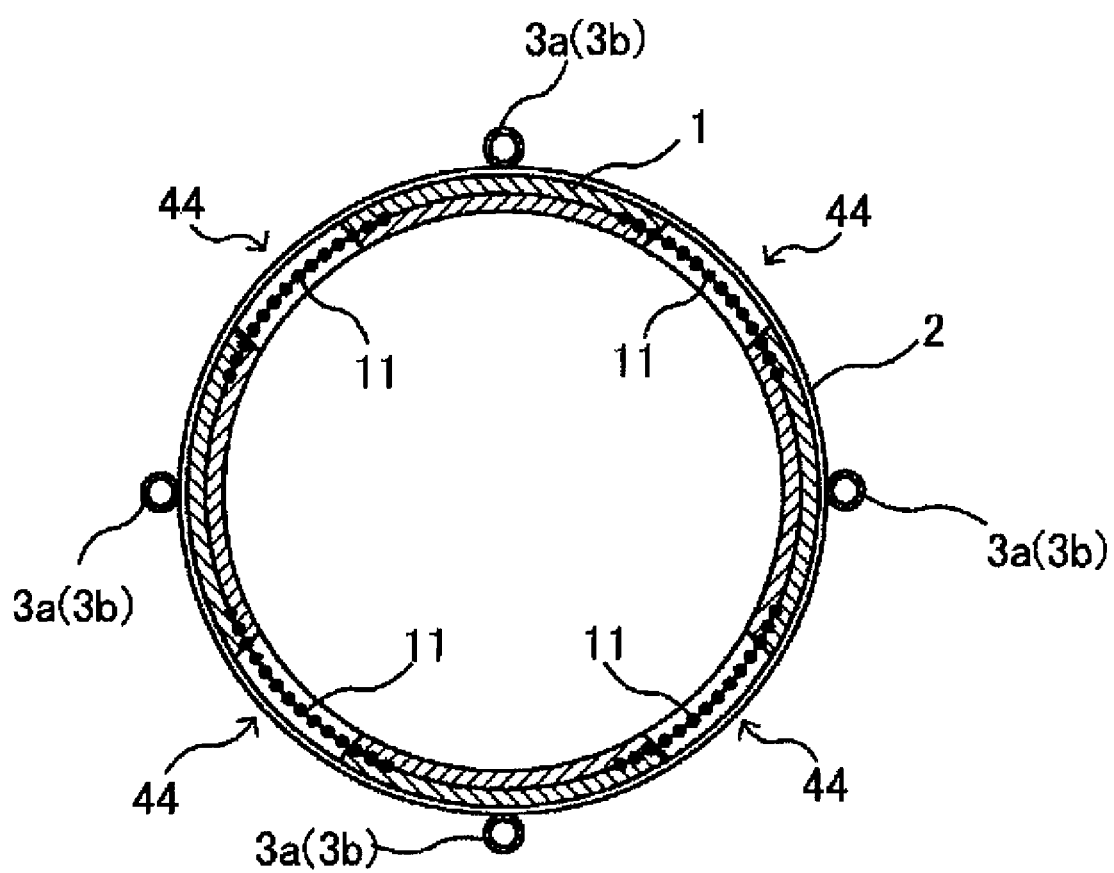
FIG. 10 is a cross-sectional explanatory view of a fixing device according to the fourth embodiment.

On the external wall material 1, as also shown in FIG. 10A, air pores 44 are bored and the air pores 44 send air as much as possible to planted roots of plants and nurture the growth of the plants. This external wall material 1 is formed of a matt made of flexible foamable resin having a thickness of around 1 cm, which is rounded in a cylindrical shape. However the external wall material 1 is not limited to such a constitution, a cylindrical body made of foamable resin which is preliminarily formed in a cylindrical shape may be used.

Further, the reinforcing latticework 2 is configured, in a similar way as the fixing device B, to arrange flexible lattice-like sheets formed of synthetic resin or the like along the external wall material 1.

Further, the supporting post pipes 3a, 3b are pipes having an outside diameter of about 1.7 cm, an inside diameter of about 1.3 cm, and a length of about 50 cm. In the fourth embodiment, vinyl chloride pipes are used.

Further, the air pore 44 is configured to arrange a net 11 for preventing soil held in the box part 40 from leaking from the air pore 44.

Further, the lower box part 40b, in a similar way as the upper box part 40a, is configured to arrange similar holes as the air pore 44 on the external wall material 1 and the hole functions as a flow-through opening 10 for flowing water retained in the water reservoir tray 4 and air.

A water purification equipment 42, as shown in FIG. 9, has a role of, when water retained in the water reservoir tray 4 is absorbed into the soil held in the box part 40, purifying water while flowing water and air, and ionizing components of a soil 41 dissolved in retained water 51, and is constituted of a porous body holder 50 as an air and water flow-through unit and an aeration passage 6 having a cylindrical shape which is inserted into the porous body holder 50 and functions as an air intake unit. Here, in FIG. 9, the aeration passage 6 is drawn short for convenience of explanation, but actually, the aeration passage 6 is configured to have a length to an extent that when water reservoir tray 4, the water purification equipment 42, and the box part 40 are assembled, the tip end of the aeration passage 6 sticks out from the upper opening of the box part 40.

The porous body holder 50 includes a first holding part 45 which includes a plurality of communicated pores formed on its wall surface and in the bottom so that water can flow through the pore, and a second holding part 47 in which above-mentioned aeration passage 6 is mounted, and in a more upper part of the second holding part 47, a soil leakage prevention net 48 which has a diameter of approximately the same as the inside diameter of the box part 40 and is made of mesh fabric in a circular cylindrical shape on a plan view, and a root prevention sheet 18 are arranged.

The first holding part 45 holds a porous body (for example, active coal, bamboo coal, bincho coal, pumice and the like), and is configured to cause the porous body to remove foreign substances contained in the water and to purify water which is supplied from the water reservoir tray 4 to the soil 41. Further, the first holding part is configured to cause the porous body to ionize the components of the soil 41 dissolved in the retained water 51 and to activate water supplied to the soil 41.

The second holding part 47 holds a lump of microorganism containing pumice and soil bacteria, and is configured to cause the water purified in the first holding part to contact to the air from the aeration passage 6, pumice, and soil bacteria and to enable to supply the water containing a lot of minerals and useful bacteria to planted plants. Further, the second holding part 47 holds water absorptive polymer, and has a role of releasing water slowly when the soil 41 is short of water. Particularly, since, in the inside of the second holding part 47, soil flora resides on the surface of the water absorptive polymer, the second holding part 47 is configured to maintain a constant balance of microorganism in the soil 41, regardless of kinds of biomass planted in the fixing device D.

Further, the soil leakage prevention net 48 is to prevent soil held in the box part 40 from falling down to the water reservoir tray 4. Further, the root prevention sheet 18 is to prevent the root part of the planted biomass from tangling with the porous body holder 50.

Figure 10B:
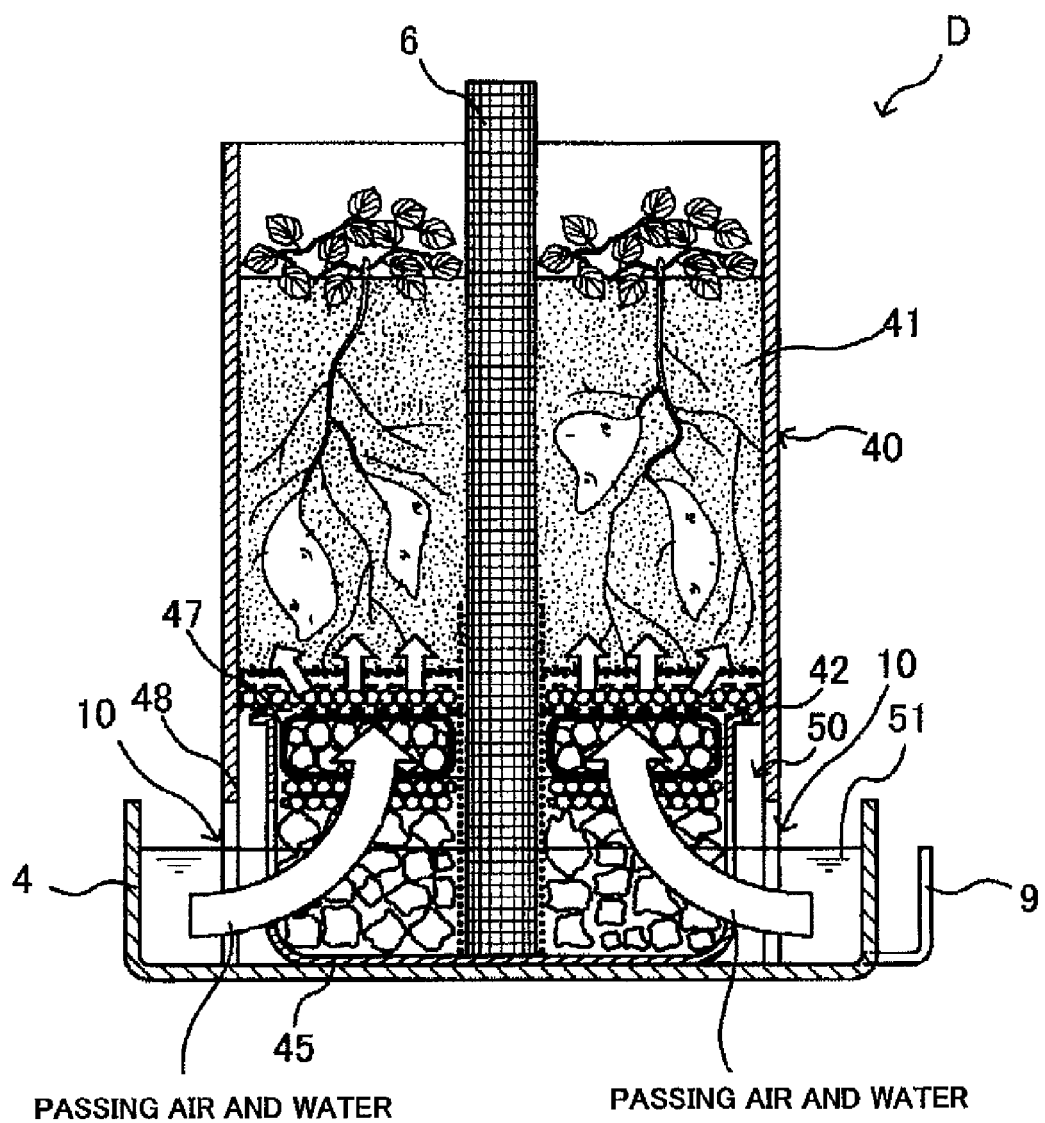

According to the fixing device D, as shown in FIG. 10B, it is possible to suck up retained water 51 retained in the water reservoir tray 4 by capillary action, to remove foreign substances in the holding part 45, and next, to add useful bacteria and minerals in the second holding part 47 and to supply the water to the soil 41. Here, the soil 41 may be material which has properties of passing air, passing water, retaining water, and retaining compost, and is suited for the living of soil bacteria, may not necessarily be natural soil, and hence, for example, comparatively light-weight artificial soil may be used.

Figure 11:
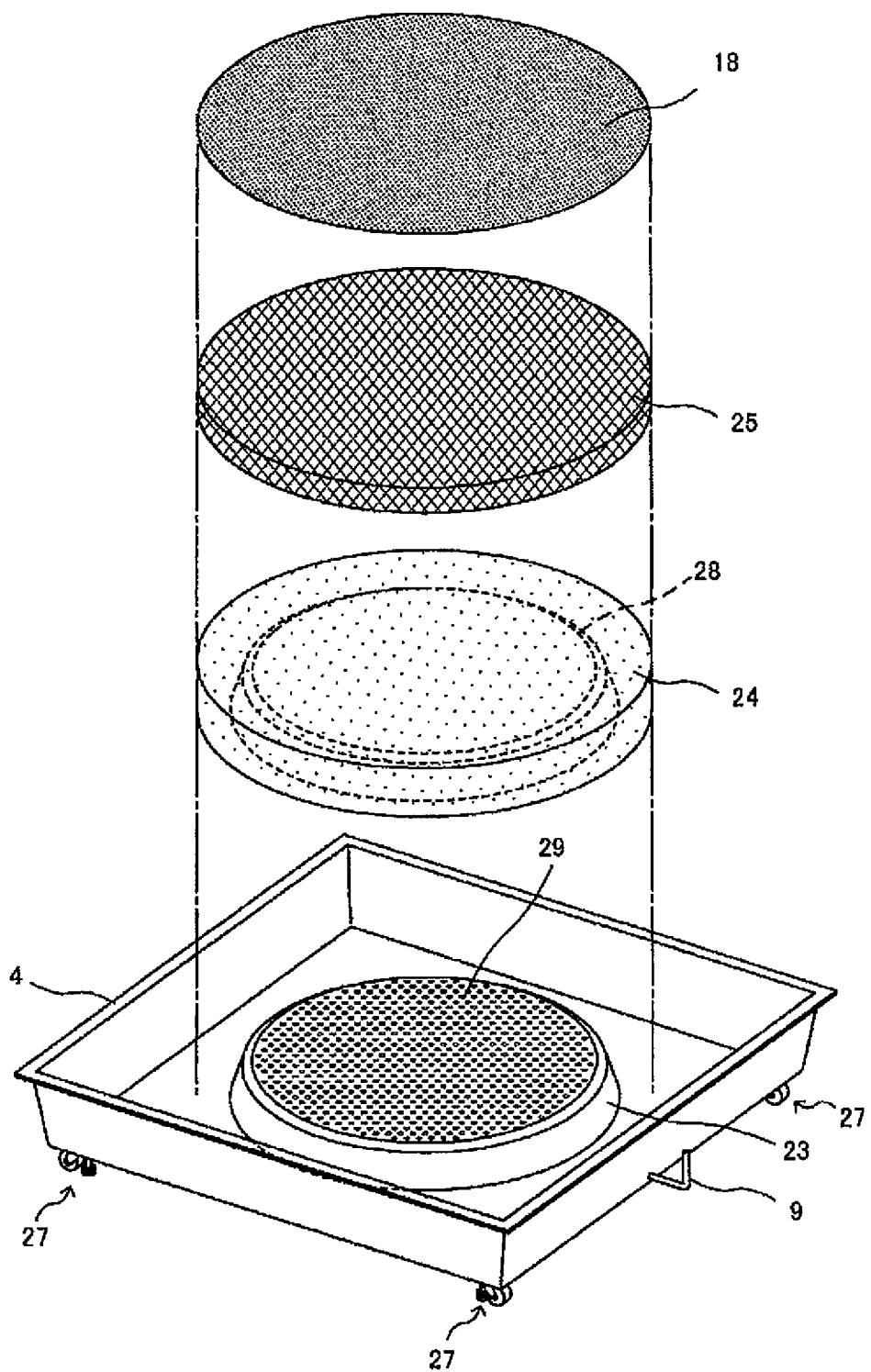
FIG. 11 is an explanatory view showing an example of modification of a water reservoir tray.

Further, the porous body holder 50, as shown in FIG. 11, and FIG. 12, may be configured so that the water reservoir tray 4 and the porous body holder 50 are approximately integrated.

To be more specific, as shown in FIG. 11, it is possible to be configured to stack up a water supply body 24, a porous holding part 25, and the root prevention sheet 18 on top of an aeration mounting part 23 having a shape of circular cone with a head on the tip which is formed in the center portion of the water reservoir tray 4. Here, in FIG. 11, a symbol 27 is a caster fixed in the four corners of the rear part of the water reservoir tray 4 to facilitate the transfer of the fixing device D. The caster 27 may be removed from the water reservoir tray 4 as needed.

Here, in the aeration mounting part 23, an aeration plane part 29 on the upper face part of which, a plurality of air pores are bored, is formed and the aeration mounting part 23, as shown in FIG. 12, is configured to enable the air to flow from the bottom of the water reservoir tray 4 toward the water supply body 24 arranged on the aeration mounting part 23, as blank arrow 33 shows.

Further, the water supply body 24 is formed in an approximate shape of disk in appearance which includes a circular cone with head-on-tip concave part 28 with such a shape that which engages with above-mentioned aeration mounting part 23 in the rear part. And the water supply body is formed of sponge material which can pass retained water retained in the water reservoir tray 4 through the flow-through opening 10 and can hold water. Further, a portion of the water supply body 24 which contacts to the aeration plane part 29 is formed with the thickness of the sponge material being rather thin and is configured so that air which passes through the aeration plane part 29 can pass toward the porous body holding part 25. Here, an arrow symbol 34 shown in FIG. 12 shows the flow of the retained water 51 which flows through the flow-through opening 10 and the air.

The porous body holding part 25 assumes a similar function as the above-mentioned first holding part 45 and second holding part 47 and surrounds a mixture of porous body (for example, active coal, bamboo coal, bincho coal pumice and the like), soil bacteria, and water absorptive polymer with the soil leakage prevention net 48 and is formed in an approximately disk shape in appearance.

This porous body holding part 25, by the air and the retained water 51 sent through the water supply body 24 being introduced inside through the soil leakage prevention net 48 and contacting porous body, causes the contacted air and the retained water 51 to include ions.

Further, a portion of the retained water 51 is supported by water absorptive polymer held in the porous body holding part 25 and keeps moisture inside of the porous body holding part 25.

And, the air and the retained water 51 which take in ions in the porous body holding part 25 diffuse into the cultivating soil 8 through the root prevention sheet 18, supply a large amount of ions to the cultivating soil 8, and accelerate growth of the planted biomass.

In FIG. 11, to mount a box part 40 having a circular shape on a cross-sectional view, the aeration mounting part 23, the water supply body 24, the porous body holding part 25, the root prevention sheet 18 are formed in a circular shape on a plan view, however, it is needless to say that they may be changeable depending on the shape on a cross-sectional view of the box part 40.

Next, a growth test of biomass in the fixing device D according to the embodiment is explained.

In the test, comparison of degree of growth between biomass planted in the fixing device D and biomass planted in a commercially available planter was performed. In the test, sweet potatoes (naruto kintoki) are selected as biomass planted as a body under test, and comparison was performed by calculating total areas of the leaves grown in 50 days.

Further, amounts of the cultivating soil 8 held in the fixing device D and in the commercially available planter were both 35 L. Two stocks each was selected at random out of many seedlings and was planted. Here, the four planted seedlings were confirmed to have no difference in the degree of growth.

As a result, the number of leaves of the two potatoes cultivated in the commercially available planter was 95, and the total area was $0.3 \text{ m}^2$. On the other hand, the number of leaves of two potatoes cultivated in the fixing device D was 164 and the total area was $1.29 \text{ m}^2$.

From the result, according to the fixing device A to D relating to the present embodiment, it is found out that since ionized colloidal culture solution can be stably supplied, it is possible to nurture effectively the growth of the biomass planted in the soil 41, as compared with commercially available planter. Further, since the number of leaves and area is larger, it is possible to efficiently fix carbon dioxide gas while actively performing photosynthesis.

As mentioned above, according to the fixing device A to D relating to the present embodiment illustrated in the first to fourth embodiment, it is possible to efficiently fix biomass-based solar heat and carbon dioxide gas, even when the fixing device A to D is installed in any one of mountain forest, desert, sea coast, rocky place, farm field, artificial square, veranda, and roof top.

Further, the fixing device A to D relating to the present embodiment can be used as a garbage processing fermenter which produces compost and fertilizer by burying garbage and the like in the cultivating soil 8. At this time, the cultivating soil 8 may be or may not be vegetated with biomass Particularly, when the cultivating soil 8 is vegetated with biomass, by arranging a plurality of fixing devices A to D in a closed space such as a plastic greenhouse, it is possible to form a greenhouse by fermentation heat and carbon dioxide gas generated from the buried garbage, thus further nurturing biomass growing. Further, carbon dioxide gas generated at this time is consumed as fertilizer necessary for the photosynthesis of plants.

[House Equipped with Fixing Device]

Figure 13:
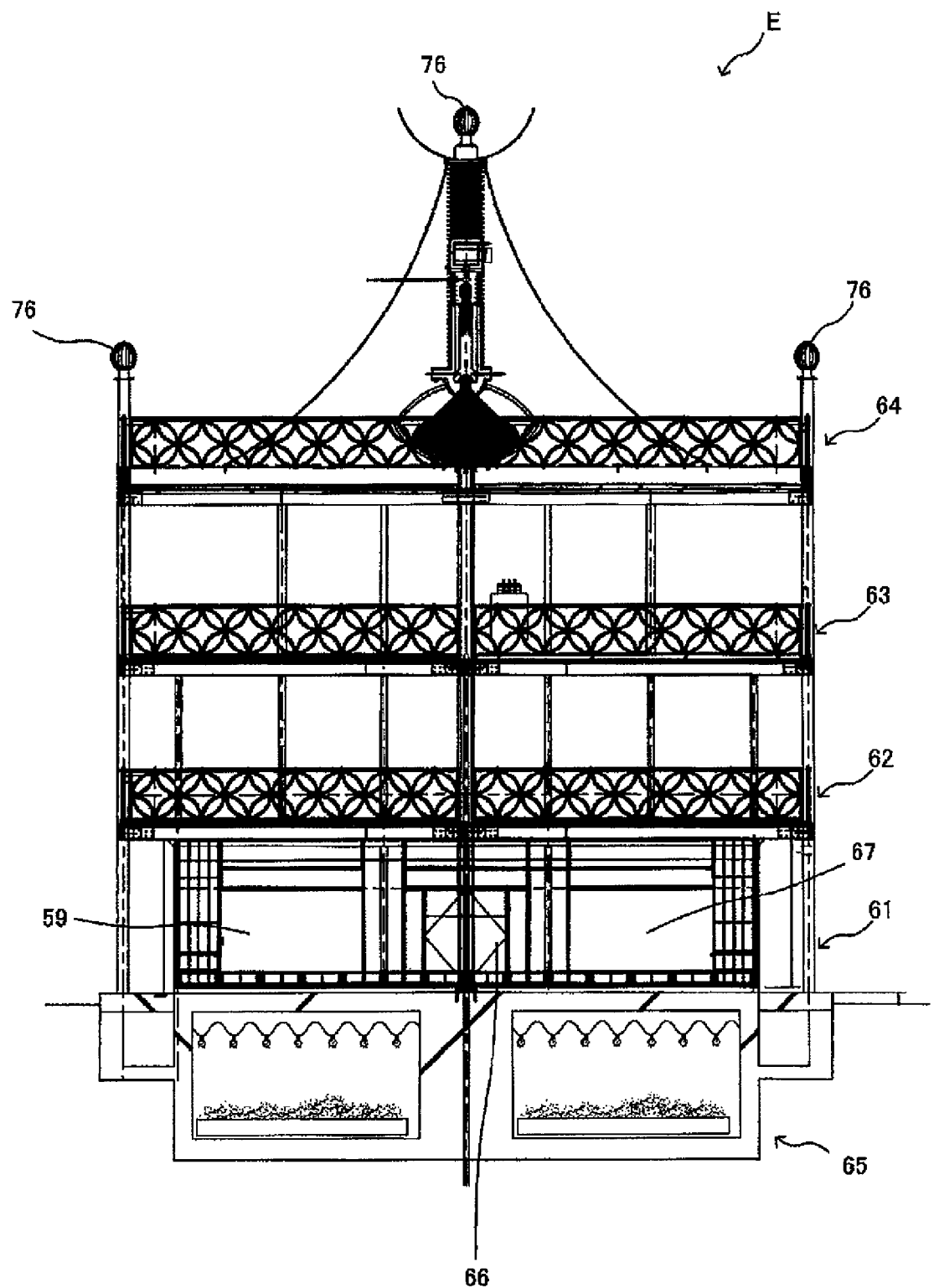
FIG. 13 is an explanatory view showing a whole constitution of a house according to the present embodiment.
Figure 14:
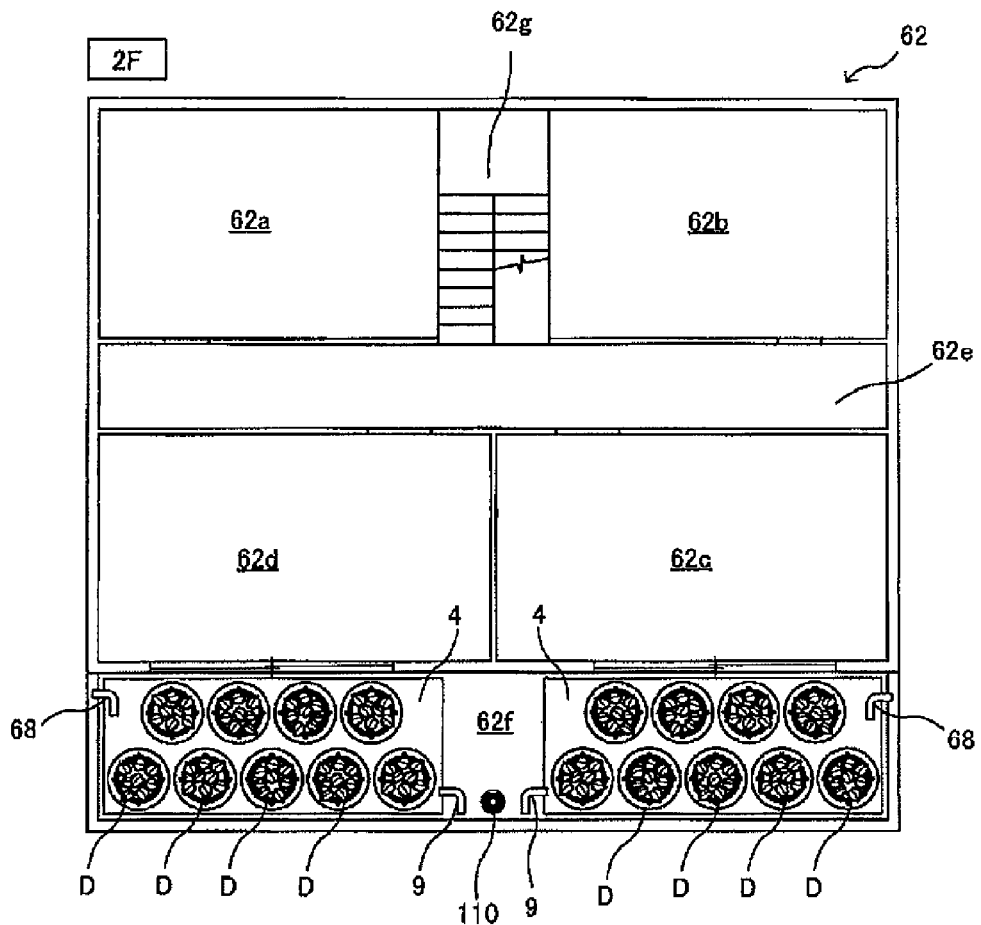
FIG. 14 is an explanatory view showing a floor plan of the second floor of the house according to the present embodiment.
Figure 15A:
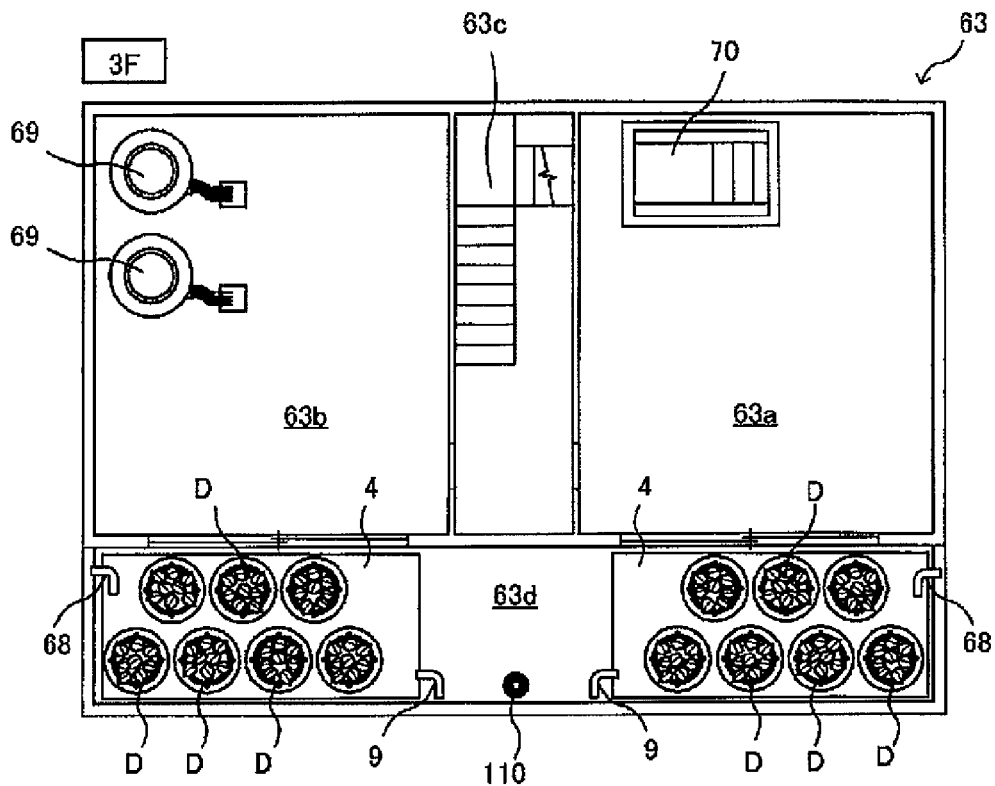
FIG. 15 is an explanatory view showing floor plans of the third floor and the rooftop of the house according to the present embodiment.

Next, a house equipped with above-mentioned device for fixing biomass-based solar heat and carbon dioxide gas is explained. FIG. 13 is a front view of a house E equipped with the fixing device, and FIG. 14 and FIG. 15 are plan views showing a structure of each floor of the house.

Though, the above-mentioned fixing device A to D is by itself, a device which cultivates and produces biomass (plant matter) by absorbing and fixing carbon dioxide gas, it is possible, by building the device into the house as a part of the constitution of the house and making the house a system provided together with a series of electricity generation mechanism described later in detail which has been preliminarily installed in the house, to absorb carbon dioxide gas generated from the electricity generation mechanism, convert solar energy into biomass energy, contain the carbon dioxide gas in a circulation system of the house, and fix the carbon dioxide gas.

Further, since a house equipped with the fixing device relating to the present embodiment arranges various kinds of electricity generation mechanisms in different places of the house, it is possible to make most effective possible use of various kinds of physical energy such as hydraulic power, wind power, thermal power, solar power and the like and to generate electricity.

Further, since a house equipped with the fixing device relating to the present embodiment includes a conversion mechanism of the above-mentioned physical energy into electrical energy, and like the above-mentioned fixing device A to D, a conversion mechanism of ecological energy which arises from life force of plants, animals (including human), bacteria, and the like, it can be said that the house organically coordinates these two energy conversion mechanisms, and stocks and circulates the energy as daily available energy.

Hereinafter, the house E relating to the present embodiment is explained specifically. The house E, as shown in FIG. 13, has three stories above ground and one below and as shown in FIG. 14 and FIG. 15, includes the devices D for fixing biomass-based solar heat and carbon dioxide gas on the second floor to the roof top and includes a bio auxiliary equipment 60 necessary for operating the fixing device D on the roof top.

Hereinafter, facilities and the like on each floor are explained. The first floor is a floor which includes facilities necessary for residents to live, an entrance 66 for entering from the outside to the house E, a guest room 67, a living room 59, and a dining, a bath room, a toilet, a study not shown in the drawing are included.

The second floor 62 is constituted of four rooms 62a to 62d such as a bed room of the residents, a corridor 62e, stairs 62g for the residents to move up and down stairs, and veranda 62f.

Particularly, the second floor 62 is characterized by arranging a plurality of the fixing devices D in the veranda 62f.

To be more specific, in the veranda 62f which constitutes an area having a lot of sunshine, a plurality of the fixing devices D are formed on a large size water reservoir tray 4, thus enabling to fix biomass-based solar heat and carbon dioxide gas and to produce food thereby.

Further, on the right and left side of the veranda 62f, carbon dioxide supply openings 68, 68 are arranged and the carbon dioxide supply opening 68 enables to retain culture fluid supplied through a pipe not shown which is arranged in a wall and connected to a bio auxiliary equipment 60 described later in the water reservoir tray 4.

Culture fluid retained in the water reservoir tray 4 supplies nutrients as well as water to each fixing device D.

Further, a drain 9 is formed in the water reservoir tray 4 and is configured to drain away extra culture fluid retained in the water reservoir tray 4 and to keep approximately constant liquid level. In addition, this culture fluid drained away from the drain 9 is recovered from a surplus water recovering opening 110 and after being got rid of foreign matters and garbage, supplied again to the fixing device D arranged in another veranda.

The third floor 63 is constituted of working rooms 63a, 63b, stairs 63c and a veranda 63d.

Particularly, the third floor 63 is characterized in that a plurality of the fixing devices D is arranged in the veranda 63d in a similar way as the veranda 62f on the second floor 62 and capacitors 69, 69 are equipped in the working room 63b. Since the fixing device D is similar as the fixing device D in the veranda 62f on the second floor 62, an explanation is omitted.

The capacitors 69, 69 are equipments for storing electric power generated in a bio auxiliary equipment 60 described later and are used as electric power which the residents in the house E use, and as illumination power supply for various kinds of plants cultivated in a basement 65.

Further, in the working room 63a, a roof top stairs 70 is installed for climbing onto a rooftop floor 64, enabling to work on the rooftop 64.

Figure 15B:
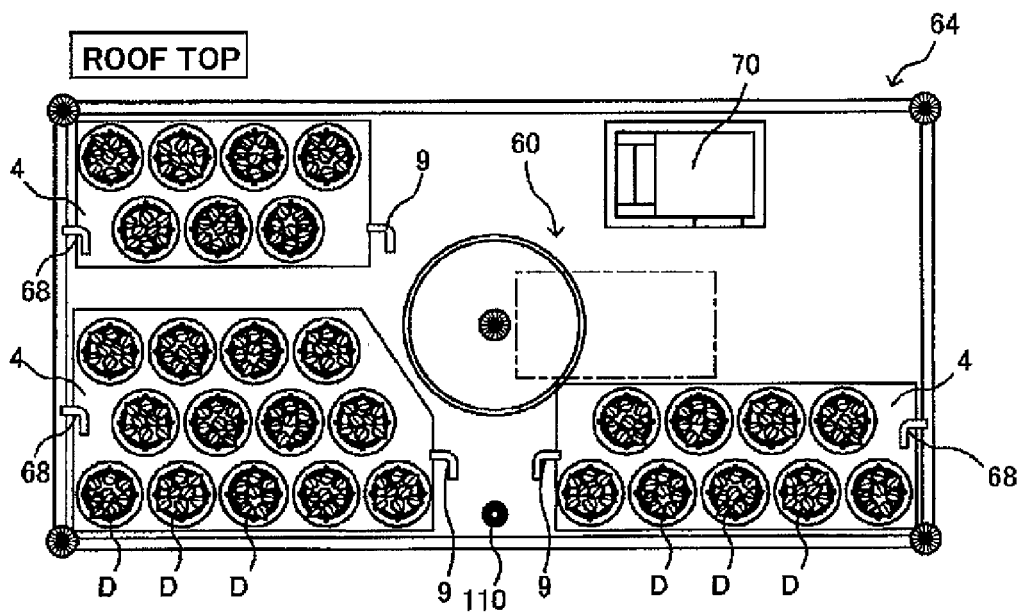

The rooftop floor 64, as shown in FIG. 15B, is a working space formed as a deck roof and since the rooftop floor 64 is a sunshine area, a plurality of the fixing devices D are arranged thereon.

Further, the rooftop floor 64 is characterized in that the bio auxiliary equipment 60 necessary for operating the fixing device D by supplying nutrients to the fixing device D arranged on each floor.

Figure 16:
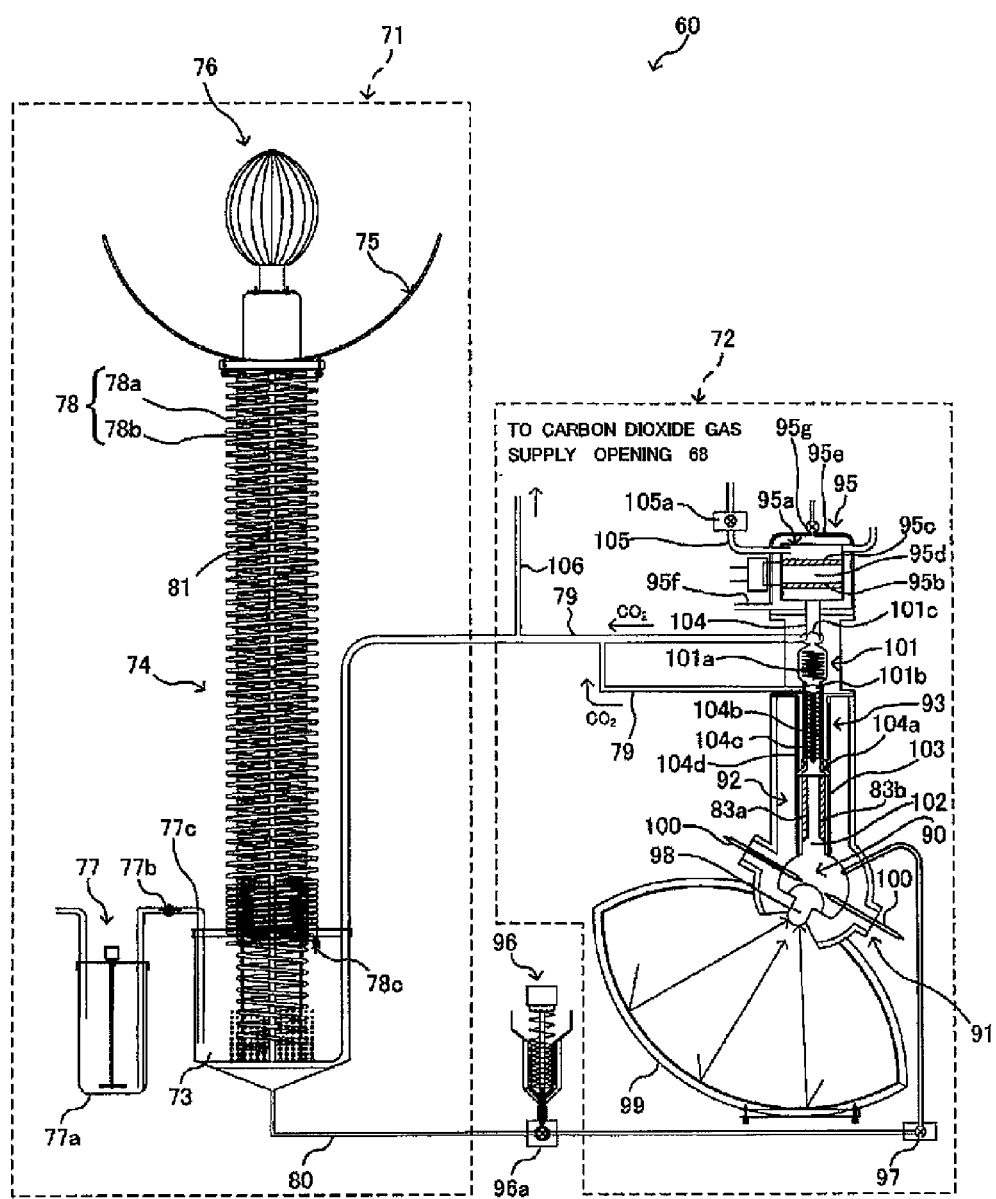
FIG. 16 is an explanatory view showing a constitution of a bio auxiliary equipment arranged in the house according to the present embodiment.

The bio auxiliary equipment 60, as shown in FIG. 16, is constituted of a biomass concentrated incubator 71 which incubates microorganism (fungi and the like) that has photosynthesis capability, such as *chlorella*, while irradiating solar heat, and a bio generator 72 which generates electricity with the use of microorganism incubated in the biomass concentrated incubator through solar heat. Here, FIG. 16 is shown schematically to facilitate understanding of the bio auxiliary equipment 60, a length and a size of each component is not necessarily accurate.

That is to say, the bio auxiliary equipment 60 is equipment which instantly gasifies biomass with concentrated solar heat energy or energy derived from solar heat, and depending on chemical reactions caused by high temperature difference, dielectric force of ionized gas fluid, high vapor pressure generated at the time and produced hydrogen, a plurality of generator mechanisms based on respectively different principles are performed in a series of systems. The bin auxiliary equipment 60 equipped with the biomass concentrated incubator 71 which constantly supplies biomass becomes a foundation which enables continuous operation of a circulation system in a house.

The biomass concentrated incubator 71 includes a biomass turbid solution storage tank 73 which is constituted of a member having a light-blocking property and causes living plant biomass in liquid mixed with plant biomass and water to make the dark reaction of photosynthesis, and a biomass proliferation pipe 74 which is constituted of a pipe having a translucent property and in the course of flowing the liquid stored in the storage tank, causes living plant biomass contained in the liquid to make the light reaction of photosynthesis and to proliferate.

In addition, at the top of the biomass proliferation pipe 74, a solar panel 75 with an approximately arch shape on a cross-sectional view and a wind power generator 76 which is configured to generate electricity by combining many pieces of blades and by revolving with the wind are arranged, and the biomass proliferation pipe 74 is configured to supply electric power necessary for operating the biomass concentrated incubator 71. Further, the surplus electric power generated here is stored in the capacitors 69, 69 arranged on the third floor 63 and in the case of electric power shortage, electric power is supplied from the capacitors 69, 69.

Further, the biomass concentrated incubator 71 includes a culture fluid supplier 77 which supplies the biomass proliferation pipe 74 with culture fluids.

The culture fluid supplier 77 includes a culture fluid tank 77a which stores culture fluid, and a feed pump 77b which feeds culture fluid stored in the culture fluid tank 77a to the biomass proliferation pipe 74, and is communicated and connected with the biomass proliferation pipe 74 through a culture fluid supply pipe 77c.

The culture fluid supplied from the culture fluid supplier 77 to the biomass proliferation pipe 74 is aqueous solution which is compounded with urine, calcium primary phosphate, magnesium sulfate, glucose and the like, and appropriate quantity of vitamins and minerals, and is adjusted to have the pH of 6.0 to 7.7.

The biomass proliferation pipe 74 includes a biomass turbid solution storage tank 73 which functions as a tank storing biomass turbid solution and a biomass proliferation pipe 78 which causes *chlorella* that constitutes biomass to proliferate.

The biomass turbid solution storage tank 73 is formed of a member having a light-blocking property that can block external light, and is configured to cause the *chlorella* to make the dark reaction of photosynthesis by constantly retaining biomass turbid solution of predetermined amount in the inside.

On the other hand, the biomass proliferation pipe 78 is formed of acrylic resin with a high translucent property, and is configured, in the course that biomass turbid solution circulates the biomass proliferation pipe 78, to cause the *chlorella* to make the light reaction of photosynthesis.

In this manner, the biomass proliferation pipe 74 relating to the present embodiment is configured so that *chlorella* can efficiently perform photosynthesis and proliferate, by forming the biomass turbid solution storage tank with a member having a light-blocking property, as well as by forming the biomass proliferation pipe 78 with a member having a translucent property.

Further, the biomass turbid solution storage tank 73 is communicated and connected with a carbon dioxide supply pipe 79, and is configured to supply carbon dioxide gas generated in the bio generator 72 through the carbon dioxide gas supply pipe 79 from the bottom of the biomass turbid solution storage tank 73 into biomass turbid solution.

It is possible not only to improve proliferation efficiency of *chlorella* in the biomass turbid solution storage tank 73 by supplying carbon dioxide gas to the biomass turbid storage tank 73 in this manner, but also to suppress generation of greenhouse effect without draining a great deal of carbon dioxide gas arisen in a electricity generation process.

Further, the biomass turbid solution storage tank 73 is configured, by forming the bottom thereof in funnel shape, to increase concentration of *chlorella* in biomass turbid solution in the vicinity of the bottom by collecting *chlorella* which has matured and become deposited, in the center of the bottom formed in a funnel shape, And, it is configured so that biomass turbid solution with high concentration of *chlorella* is supplied through the biomass supply pipe 80 to the bio generator 72.

Further, the biomass proliferation pipe 74 relating to the present embodiment is configured to flow biomass turbid solution in the vicinity of the surface where comparatively immature *chlorella* is floating in the biomass turbid solution storage tank 73, from the biomass turbid solution storage tank 73 to the biomass proliferation pipe 78, to activate *chlorella* by causing *chlorella* to efficiently make the light reaction in the course of passing *chlorella* through the biomass proliferation pipe 78, thereafter, to efficiently combine *chlorella* with nutrient elements such as sugar, fatty acid, amino acid and the like and to mature *chlorella* by returning the *chlorella* to the biomass turbid solution storage tank 73.

Particularly, the biomass proliferation pipe 78 is configured so that a tube formed of acrylic resin with high translucency and flexibility is shaped to form a double helix structure erected from the bottom side of the biomass turbid solution storage tank 73 toward above.

To be more specific, the biomass proliferation pipe 78 includes an outward passage 78a of biomass turbid solution formed, in such a way as to draw a helix with a support post 81 erected vertically from the bottom of the biomass turbid solution storage tank 73 in the center, by winding the above-mentioned tube from a comparatively shallow position of biomass turbid solution in the biomass turbid solution storage tank 73 up to the upper end of the support post 81, and a return passage 78b of biomass turbid solution formed, on the inside of the helix forming the outward passage, by winding the tube from the upper end to the lower end of the support post 81 with the support post 81 in the center in such a way as to draw a helix.

And, the biomass turbid solution storage tank 73 makes biomass turbid solution inflow opening a starting point of the outward passage 78a and biomass turbid solution outflow opening an ending point of the return passage 78b. Further, a delivery pump 78c which delivers biomass turbid solution stored in the biomass turbid solution storage tank 73 to the biomass proliferation pipe 78 is arranged at an inflow opening of biomass turbid solution. Moreover, the delivery pump 78c is configured to be driven with the use of a portion of electric power generated from a solar panel 75 and a wind power generator 76.

In this manner, since the biomass proliferation pipe 78 has a double helix structure which forms the helix shaped return passage 78b which is communicated with the outward passage 78a on the inside of the helix shaped outward passage 78a of biomass turbid solution, immature *chlorella* flowing in the outward passage 78a is more receptive of light than *chlorella* flowing down in the return passage 78b, thus enabling to cause immature *chlorella* to efficiently make the light reaction.

Further, the biomass proliferation pipe 78 is configured so that a cross-sectional area of passage way of the tube constituting the outward passage 78a and a cross-sectional area of passage way of the tube constituting the return passage 78b have approximately the same cross-sectional area. However, the tube constituting the outward passage 78a is configured to have an approximately flattened shape on a cross-sectional view so that capillary action works, while the tube constituting the return passage 78b is configured to have a pipe shape where capillary action does not work.

Accordingly, in usual operation, it is possible to circulate biomass turbid solution from the biomass turbid solution storage tank 73 to the biomass proliferation pipe 78 and from the biomass proliferation pipe 78 to the biomass turbid solution storage tank 73 with almost no operation of the delivery pump 78c, thus enabling to reduce energy necessary for the culture of biomass as much as possible and to further improve the culture efficiency.

That is, in the present embodiment, since a gap between the upper face and the lower face of the tube constituting the outward passage 78a of biomass turbid solution in the biomass proliferation pipe 78 is formed quite small and yet, in a flattened shape, it is possible to suck up biomass turbid solution from the biomass turbid solution storage tank 73 to the biomass proliferation pipe 78 using capillary action of the tube constituting the outward passage 78a. Further, since the pipe shape of the return passage 78b in which biomass turbid solution turns to flow down at the top is formed in a shape where capillary force does not work, biomass turbid solution flows down by gravity. And yet, *chlorella* in biomass turbid solution which has entered the return passage 78b, since it has become comparatively heavier by absorbing light energy, flows down through the return passage 78b by its own gravity, and a force by which the biomass turbid solution flows down works as suction force to suck up biomass turbid solution in the outward passage 78a and hence, enabling to circulate biomass turbid solution with little force, and enabling to reduce electric power used for driving the delivery pump 78c to reduce as much as possible.

Figure 17A:
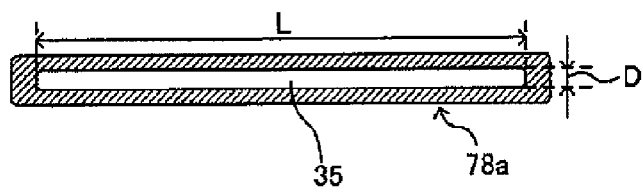
FIG. 17 is an explanatory view showing an outward passage and a return passage, and an example of modification of the outward passage.
Figure 17B:
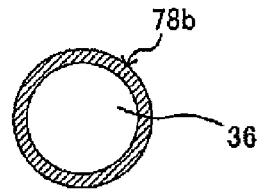

Further, as mentioned above, by forming a shape of the pipe of the return passage 78b of biomass turbid solution in the biomass proliferation pipe 78 in a circular shape, as compared with the outward passage 78a, the capillary force is opened and hence, it is also possible to flow through *chlorella* while inhibiting *chlorella* to get clogged in the tube. As shown in FIG. 17A, the outward passage 78a is formed in a shape of flattened pipe where capillary force works, on the other hand, as shown in FIG. 17B, the return passage 78b is formed in a shape of approximate circular pipe on a cross-sectional view. Here, a length L of flow-through space 35 of the outward passage 78a on a cross-sectional view is 10 to 30 cm, and a width D (gap) is around 0.2 to 0. 3 mm long, and an internal diameter of the flow-through space 36 of the return passage 78b is 5.1 mm to 10.7 mm long, and cross-sectional area of the flow-through space 35 of the outward passage 78a and cross-sectional area of the flow-through space 36 of the return passage 78b is approximately the same area or the cross-sectional area of the flow-through space 36 of the return passage 78b is of slightly larger area. Further, the flow-through space 36 of the return passage 78b is of pipe diameter which does not allow capillary force to arise depending on the viscosity of biomass turbid solution.

In the biomass proliferation pipe 74 constituted in this manner, *chlorella* matured in the biomass turbid solution storage tank 73 get deposited downward by its own weight, and since *chlorella* floating in the vicinity of inflow opening of biomass turbid solution is comparatively immature and of quite small size, biomass turbid solution containing the immature *chlorella* flows upward through a tube with fine flattened internal diameter constituting the outward passage 78a by capillary force without getting clogged in the tube.

After that, biomass turbid solution containing *chlorella* which has proliferated during flowing through the outward passage 78a flows down through the return passage 78b. And as described above, since a pipe shape of the tube constituting the outward passage 78a is formed in a flattened shape, the biomass turbid solution climbs up by capillary force and flows into a circular pipe with no capillary force at the top and flows down by gravity. And yet, since matured *chlorella* has become of heavier specific gravity, the biomass turbid solution containing mature *chlorella* again flows into the biomass turbid solution storage tank 73 without getting clogged in the tube.

In addition, in the present embodiment, the flow-through space 35 of the outward passage 78a is formed in an approximately rectangular shape on a cross-sectional view, but the embodiment is not limited to this shape. For example, as shown in FIG. 17C, in the inside of the outward passage 78a, a flow-through space 37 through which a space with a shape of oblong diamond on a cross-sectional view is communicated in the horizontal direction may be formed and the flow-through space 37 may be configured to increase quantity of flow while enabling capillary action to arise.

Figure 17C:
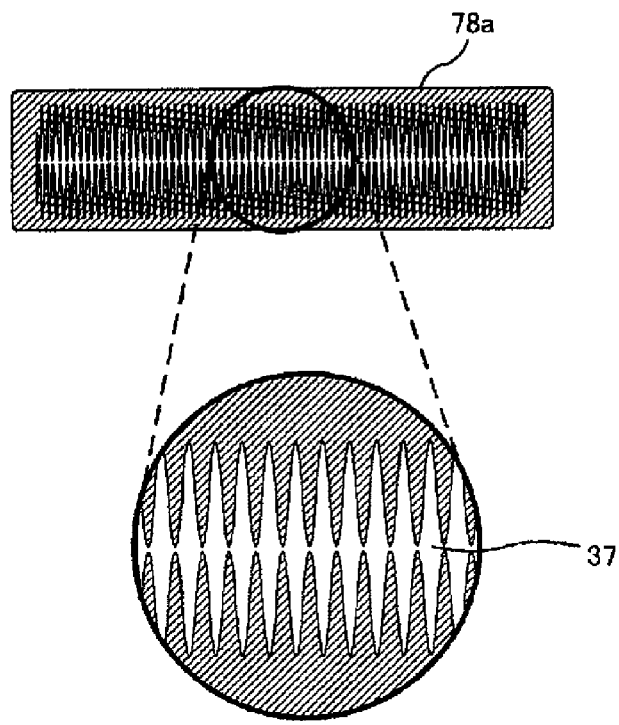
Figure 17D:
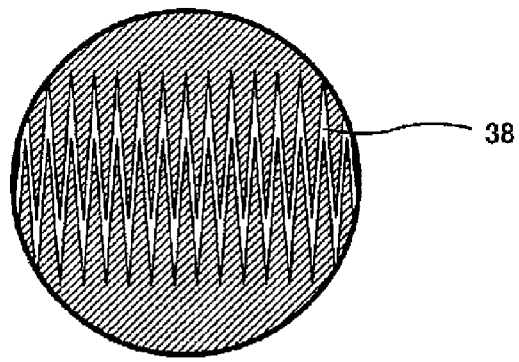

Further, in a similar manner, as shown in FIG. 17D, a flow-through space 38 with a zigzag shape on a cross-sectional view may be formed and the flow-through space 38 may be configured to increase quantity of flow, while enabling capillary action to arise In the case of making up a constitution shown in FIG. 17C or FIG. 17D, the flow-through space 37 or the flow-through space 38 is desirable to have the narrowest possible structure, and it is good to be configured so that a gap between the opposing wall of the pipe is around 0.2 to 0.5 mm long.

Biomass turbid solution cultured in this manner is supplied to the bio generator 72 and used for generating electricity. That is to say, the biomass concentrated incubator 71 can be said to function as bioenergy conversion mechanism to convert solar light energy or solar heat energy to bioenergy and also can be said to be a form of fixing device of solar heat and carbon dioxide gas.

Next, the bio generator 72 is specifically explained.

The bio generator 72 includes a reacting furnace 90 which instantly heats up biomass turbid solution produced in the biomass concentrated incubator 71 to the temperature that causes the biomass turbid solution to plasmatize, a thermal element generator part 91 which generates electricity with a temperature difference between the high temperature in the reacting furnace 90 and outside temperature of the reacting furnace 90, an electromagnetic fluid generator part 92 which generates electricity by electromagnetic induction with the use of plasma flow of the biomass turbid solution plasmatized by the reacting furnace 90, a gas turbine generator part 93 which generates electricity by rotating turbine with the use of gas flow plasmatized and of high pressure, a gas reforming preparative separation part 101 which adjusts a temperature of the gas flow after rotating the turbine, increases hydrogen concentration in the gas, and preparatively separated hydrogen gas, and a fuel cell generator part 95 which generates electricity by reacting hydrogen preparatively separated in the gas reforming preparative separation part 101 and oxygen in the atmosphere and is configured to generate electricity in multiple stages using biomass turbid solution.

That is to say, the bio generator 72 constitutes an energy conversion mechanism in which a plurality of electric power generation units that generate electricity with the use of high temperature difference, ionized gas flow, high vapor pressure, which are generated by an evaporating unit which instantly evaporates biomass turbid solution by heating, and generated hydrogen, based on respectively different principles, work in a series of systems.

Further, in the midway portion of the biomass supply pipe 80 which supplies biomass turbid solution from the biomass concentrated incubator 71 to the reacting furnace 90, a reaction components adjuster 96 which mixes the biomass turbid solution that flows through the biomass supply pipe 80 with extra biomass preliminarily stocked, biomass of other kind of living matter, fossil fuels such as crude oil, coal and the like (hereinafter, collectively referred to as "auxiliary fuel") is provided.

The reaction components adjuster 96 is configured to mix the biomass turbid solution which flows though the biomass supply pipe 80 with powdered or liquefied auxiliary fuel (for example, liquefied coal or powdered coal) and includes an adjusting valve 96a which adjusts a quantity of auxiliary fuel to be mixed with biomass turbid solution.

The adjusting valve 96a is a valve for adjusting elemental composition (for example, content ratio of hydrogen atom, oxygen atom, and carbon atom which constitute biomass turbid solution) by adjusting a quantity of auxiliary fuel and is also a valve for supplying hydrogen atom source for producing hydrogen gas in the gas reforming preparative separation part 101 and other elements necessary for gas production reaction, while adjusting them.

Further, when it lacks sunlight due to rainy or cloudy weather, growth and proliferation of biomass in biomass turbid solution is not sufficient, and accordingly, it can be considered that a quantity of electricity generation in the bio generator 72 decreases. However, even in this case, it is possible to secure calorie required for combustion of biomass turbid solution by adding auxiliary fuel into biomass turbid solution while adjusting the adjusting valve 96a appropriately, thus enabling to realize stable generation of electricity.

In addition, although the present embodiment is configured so that the reaction components adjuster 96 mixes biomass turbid solution with fossil fuel, the embodiment may be configured, for example, so that the reaction components adjuster 96 is given a function of compost production machine which disposes of garbage and the reaction components adjuster 90 mixes biomass turbid solution with organic-matter-containing fluid or solid residue produced here by fermentation. Further, the reaction components adjuster 90 may be configured to grind down discarded garbage and make it paste-like and to mix biomass turbid solution with it in a state in which reaction area is expanded.

Further, at an end portion on the side of the reacting furnace 90 of the biomass supply pipe 80, an injection pump 97 which makes biomass turbid solution supplied from the biomass concentrated incubator 71 misty and injects this misty biomass turbid solution toward the reacting furnace is provided.

In the reacting furnace 90, a heated body 98 which increases temperature in the reacting furnace 90 up to 1000 to 3000 degrees centigrade is arranged in a state that the heated body is exposed to the outside of the reacting furnace 90. The heated body 98 functions as a heat exchanger which generates heat by concentrated solar light.

To be more specific, in the lower portion of the reacting furnace 90, a concave light-collecting body 99 which collects solar light is angle-adjustably arranged and the light collecting body 99 is configured to enable to heat the heated body 98 up to 1000 to 3000 degrees centigrade by turning the angle of the concave light-collecting body 99 to the sun and setting the focal position to the heated body 98.

In the reacting furnace 90, a large number of thermocouples 100 with one end facing inside of the reacting furnace 90 and the other end facing outside of the reacting furnace 90 are arranged, and constitute a thermal element generator part 91. Electric power produced by Seebeck generation of electricity in the thermal element generator part 91 is stored in the capacitors 69, 69 arranged in the working room 63b on the third floor 63 through cables not shown.

Further, in the reacting furnace 90, biomass turbid solution is sprayed on the heated body 98 with high temperature. And then, this biomass turbid solution is instantly plasmatized by thermal dissociation and arrives at the electromagnetic fluid generator part 92 in upward flow.

The electromagnetic fluid generator part 92 is constituted by arranging magnets 103 around a plasma flow pipe line 102 with a cylindrical shape having a resistance property as well as arranging a pair of positive and negative electrodes 83a, 83b in a magnetic field of the magnet 103, and is configured, when plasma flow in an ionized state rises through the plasma flow pipe line 102 and passes in the magnetic field of the magnet 103, to cause electromotive force between the electrodes and to generate electricity. This electric power produced in the electromagnetic fluid generator part 92 is also stored in the capacitors 69, 69 arranged in the working room 63b on the third floor 63 through cables not shown.

In this manner, the plasma flow supplied to the electromagnetic fluid generator part 92 arrives at the gas turbine generator part 93 in a state that high temperature and pressure are maintained.

The gas turbine generator part 93 includes a screw type turbine 104b which rotates by gas flow sent to the inside through an air intake pipe 104a, a primary coil 104c which rotates together with this turbine 104b and to which predetermined voltage is applied, and a secondary coil 104d which converts the change in magnetic field arisen from the rotation of the primary coil 104c to electric current. In addition, the primary coil 104c of the gas turbine generator part 93 functions as a magnet by being applied with predetermined voltage and the gas turbine generator part 93 is configured so that with regard to this voltage applied to the primary coil 104c, a portion of electric power generated by each generator part is used.

And, the generator part 93 is configured so that this electric power generated by the gas turbine generator part 93 is also stored in the capacitors 69, 69 arranged in the working room 63b on the third floor 63 through cables not shown and can be used as electric power for living.

Further, this gas turbine generator part 93 is communicated and connected with the gas reforming preparative separation part 101 and the gas flow which causes the turbine 104b to rotate is drained and sent toward the gas reforming preparative separation part 101.

The gas reforming preparative separation part 101 includes a carbon dioxide gas removal part 101b which removes carbon dioxide gas from the gas flow after causing the turbine to turn, a heat exchanger 101a which performs gas reforming by controlling the temperature of the gas flow removed with carbon dioxide gas to become 300 to 500 degrees centigrade suited for production of hydrogen, and a hydrogen gas preparative separation part 101c which preparatively separates secondary carbon dioxide gas and hydrogen contained in the reformed gas.

In the gas flow supplied from the gas turbine generator part 93 to the gas reforming preparative separation part 101, mainly, carbon dioxide gas, hydrogen gas, carbon monoxide gas, methane gas, and water vapor arisen from the water in biomass turbid solution are contained and firstly, in the carbon removal part 101b, separation of carbon dioxide gas is performed. In this carbon dioxide gas removal part 101b, a partition (not shown in the drawing) formed of material with permeability of only carbon dioxide gas is arranged and the carbon dioxide gas removal part is configured to separate supplied gas into carbon dioxide gas and other residue gas and to enable to take out carbon dioxide gas.

The carbon dioxide gas preparatively separated in the carbon dioxide gas removal part 101b is sent to a carbon dioxide gas supply pipe 79 and supplied to the biomass concentration incubator 71, carbon dioxide gas supply openings 68, 68.

On the other hand, the hydrogen gas, carbon monoxide gas, and methane gas which are to remain in the carbon dioxide gas removal part 101b arrive at the heat exchanger 101a.

The heat exchanger 101a is configured to perform dissociation and association of components of the residue gas by adjusting temperature of the gas flow at 300 to 500 degrees centigrade and to produce hydrogen gas. To be more specific, the heat exchanger 101a includes a heater which heats gas flow by utilizing a portion of electric power generated by the other each generator part and a cooler (not shown in the drawing) which cools gas flow by passing water supplied from the outside and is configured to make the temperature of the gas flow adjustable. Further, on the surface of the heat exchanger 101a to which gas flow contacts, platinum which catalyzes reaction described later is provided thus reacting methane gas, carbon monoxide gas, and water to produce hydrogen and carbon dioxide. That is, the heat exchanger 101a also functions as a catalyst mechanism which together with platinum causing catalyst action, adjusts temperature of the gas flow and accelerates reaction.

The reaction in here is performed in accordance with the following chemical reaction formula.

$$44CO + 44H_2O \rightarrow 44CO_2 + 44H_2 \quad (1)$$

$$30CH_4 + 30H_2O \rightarrow 30CO + 17H_2 \quad (2)$$

$$30CO + 30H_2O \rightarrow 30CO_2 + 30H_2 \quad (3)$$

That is, as shown in (1), the carbon monoxide contained in the residue gas in the carbon dioxide gas removal part 101b reacts with water in the heat exchanger 101a and carbon dioxide gas and hydrogen gas are produced. By this reaction, hydrogen concentration in the gas flow is increased.

Further, as shown in (2), the methane gas contained in the residue gas in the carbon dioxide gas removal part 101b reacts with water in the heat exchanger 101a and carbon monoxide and hydrogen are produced. By this reaction too, hydrogen concentration in the gas flow is increased.

Still further, as shown in (3), carbon monoxide produced in (2) also reacts with water in the heat exchanger 101a and carbon dioxide gas and hydrogen gas are produced and hydrogen concentration in the gas flow is increased.

In this manner, the heat exchanger 101a converts most of the carbon monoxide and methane gas contained in the residue gas in the carbon dioxide gas removal part 101b to carbon dioxide gas and hydrogen gas and increases hydrogen concentration in the gas flow and a concentration of carbon dioxide gas is also increased. In addition, although in the present embodiment, material as catalyst in the heat exchanger 101a is made of platinum, the material may be made of rhenium. Further, in FIG. 16, the gas reforming preparative separation part 101 is drawn schematically and actually, the gas reforming preparative separation part 101 is configured to have a shape (size and length) enough to give sufficient time for carbon monoxide and methane gas to react.

The gas flow reformed in the heat exchanger 101a, next, arrives at the hydrogen gas preparative separation part 101c.

In the hydrogen gas preparative separation part 101c, preparative separation film which preparatively separates only hydrogen gas from mixed gas with hydrogen gas and carbon dioxide gas produced in the heat exchanger 101a.

The hydrogen gas preparatively separated here arrives at the fuel cell generator part 95, and the carbon dioxide gas is sent to the carbon dioxide gas supply pipe 79.

To be more specific, the hydrogen gas preparative separation part 101c is communicated and connected with the fuel cell generator part 95 through hydrogen gas supply pipe 104 and is communicated and connected with biomass concentrated incubator 71 through carbon dioxide gas supply pipe 79.

The carbon dioxide gas sent to biomass concentrated incubator 71 by the carbon dioxide gas supply pipe 79 is dissipated from under part of the biomass turbid solution storage tank 79 and becomes carbon dioxide gas necessary for photosynthesis of biomass.

Further, in the midway part of the carbon dioxide gas supply pipe 79, a branch pipe 106 is arranged and is configured to supply a portion of the carbon dioxide gas to the fixing device D through the carbon dioxide gas supply opening 68 arranged in the second floor 62, the third floor 63, and the rooftop floor 64, enabling to fix carbon dioxide gas and also to nurture cultivation of crop plants. In this case, as a method for supplying carbon dioxide gas to the fixing device D, it may be good to constitute so that each fixing device D is held in a plastic greenhouse to dissipate carbon dioxide gas emitted from the carbon dioxide gas supply opening 68 to the plastic greenhouse, and further, it may also be good to constitute so that in the midway part to the carbon dioxide gas supply opening 68 of the branch pipe 106, an aeration tank (not shown in the drawing) which dissolves carbon dioxide gas in water is provided and the solution dissolved with carbon dioxide gas is supplied to each fixing device D.

The fuel cell generator part 95 includes a fuel cell 95a which generates electricity by electrochemically burning hydrogen gas supplied from the gas reforming preparative separation part 101 through the hydrogen supply pipe 104 and oxygen in the atmosphere.

And, the fuel cell generator part 95 is configured so that this electric power generated by the fuel cell generator part 95 is also stored in the capacitors 69, 69 arranged in the working room 63b on the third floor 63 through cables not shown and can be used as electric power for living.

This fuel cell 95a includes a first electrode 95b which constitutes a hydrogen electrode, a second electrode 95e which constitutes an oxygen electrode, and an electrolysis tank 95d loaded with electrolysis solution which submerges the first electrode 95b and the second electrode 95c, and the hydrogen gas supply pipe 104 is connected to the vicinity of the first electrode 95b of the electrolysis tank and the oxygen supply pipe 105 for supplying oxygen is connected to the vicinity of the second electrode 95c in the electrolysis tank.

Further, the oxygen supply pipe 105 includes a squeeze pump 105a for supplying ambient air to the electrolysis tank 95d. Further, the squeeze pump 105a includes an adjusting valve which enables to adjust quantity of oxygen supplied to the electrolysis tank 95d.

Further, the fuel cell generator part 95 includes a water heater 95e which converts cool water to hot water by using heat generated when the fuel cell 95a generates electricity and is configured to utilize hot water in a bathroom and a kitchen, the biomass concentrated incubator 71 and the like by supplying hot water from the water heater 95e through a hot water supply pipe 95f. Here, a symbol 95g in the drawing is an adjusting valve which adjusts an amount of tap water supplied to the water heater 95e.

In this manner, the bio generator 72 is configured to efficiently generate electricity in multiple stages with the use of the thermal element generator part 91, electromagnetic fluid generator part 92, gas turbine generator part 93, and the fuel cell generator part 95 and to constitute cogeneration.

A house relating to the present embodiment having above-mentioned constitution includes a device for fixing solar heat and carbon dioxide gas based on containerized-culture-like biomass, which is compactly manageable and highly efficiently fixes carbon dioxide gas and provides high productivity, and further, becomes the fixing device of solar heat and carbon dioxide gas as a whole while performing home generation of electricity and enables to become a house in which energy circulation system is constructed.

Further, the present invention can also be said to provide a biomass (plant matter) fixing device which is compact container-box-like cultivation equipment and yet which has, at the bottom, an ion exchange function that enables plants to get vital energy and to luxuriantly perform photosynthesis, and which anyone can easily cultivate in anywhere, and which has good points of both hydroponic culture and soil culture, and yet to provide a house which is manageable with an industrial method and has agricultural technology of high productivity.

According to the present invention, there is provided a house which has a function of producing and circulating a great deal of food and biomass in all residential areas including urban space. With the use of this house, it is possible to incorporate people's life into a natural circulation cycle, to absorb and fix a great deal of solar heat and carbon dioxide gas, and to prevent global warming.

That is, a device for fixing biomass-based solar heat and carbon dioxide gas in a house having a function of circulating solar energy according to the present invention is configured so that at a base portion of a box having heat insulation property, an ion exchange body having a property of passing air and water and high ion exchange function is buried and on top of the ion exchange body, cultivation soil is held.

On the periphery of this box, a plurality of openings which continue into the box and aeration passage having microscopic pores are arranged and ion exchange is performed actively. A great variety of and great deal of lives such as, bacteria (soil bacteria), protozoan algae, animals and plants, plankton, earthworms, and small fishes and the like live in that ionic environment.

Excretory substances and body fluids secreted by those living matter dissolve in water, mix with ionized soil fine substance and air, and constitute physiological colloidal solution. Ionized colloidal solution where living organisms mediate constitutes autonomous biosphere which autonomously performs ion (pH) adjustment by coaction.

The variety of ionic environment not only nurture the growth of crop plants but also stabilize life activities of all the surroundings (including human), correct rhythm of oxidation and reduction, and brings about bio therapy effect necessary for activity, stability, rest, and resuscitation of mind and body.

When plant body gets miniaturized, gets turbid with water, and gets gasified in a high temperature furnace of solar heat, the plant body becomes hydrogen, methane, carbon monoxide, and carbon dioxide gas. And all the plant body becomes hydrogen and carbon dioxide gas by further causing secondary reaction.

At this time, there arises high temperature difference of about 1000 to 3000 degrees centigrade between the inside and the outside of the reacting furnace. Providing a thermal couple circuit in this temperature gradient causes high voltage. All the gas fluids at this time have become ionized high speed fluids and cause to flow strong electric current between the electrodes arranged in a magnetic field. Further, this gas body has high pressure, turns turbine, and generates electricity.

Carbon dioxide gas and hydrogen gas can be separated using a filter due to its large difference in mass. The separated carbon dioxide gas is sent again to plants and is reproduced into biomass. The hydrogen becomes electric power and water with a fuel cell.

This four generation of electric power based on different principles is performed continuously in a series of systems and acquires nonconventional high power generation efficiency without causes of environmental pollution.

Above mentioned production activities are performed by labors of many people who get enjoyment and vitality from plant cultivation equipment according to the present invention. Production of a great deal of food and biomass with full participation of people increases biomass-based global resources.

At the same time, a great deal of plants produced increasingly absorb solar heat and carbon dioxide gas in the atmosphere in large quantity, prevent warming, and normalize even global environment. Therefore, via planting life of people, this house per se, constitutes a function body which converts and fixes biomass-based solar heat and carbon dioxide gas and circulates solar energy.

Lastly, explanation of each embodiment described above is one example of the present invention and the present invention is not limited to above-mentioned embodiments. Accordingly, it is needless to say that various modifications are possible depending on design and the like even in other cases than embodiments described above, without departing from the scope of technical ideas relating to the present invention.

For example, the biomass concentrated incubator 71 explained with reference to FIG. 16, is configured to provide the delivery pump 78c at the starting portion of the outward passage 78a and to supply biomass turbid solution in the biomass turbid solution storage tank 73 to the outward passage 78a, however, the present invention is not limited to this constitution. For example, the biomass concentrated incubator 71 may be configured to provide a discharge pump at the ending portion of the return passage 78b and to discharge biomass turbid solution in the return passage 78b toward the biomass turbid solution storage tank 73. Due to such a constitution, it is possible to assist circulation of biomass turbid solution arisen from capillary actin in the outward passage 78a.

What is claimed is:

1. A house equipped with a device for fixing biomass-based solar heat and carbon dioxide gas, the device comprising:
    an air intake unit which is configured to take air into a box;
    cultivating soil which is held inside the box, wherein the air intake unit being formed of a mesh cylindrical body which is partly buried in the cultivating soil with a part of the mesh cylindrical body above the cultivating soil exposed to the atmosphere;
    a mesh-like air and water flow-through unit laid in the bottom of the box which is configured to be open to the atmosphere;
    a water reservoir tray on which the box is mounted; and
    the air and water flow-through unit is formed by holding a porous body inside a mesh-like container through which air and water can pass, and
    the porous body is arranged in a state that the porous body sticks out from a surface of water which is retained in the water reservoir tray, ionizes water contacting the porous body, and increases ion concentration in the air in the vicinity of a water surface and ion concentration in the cultivating soil through this water;
    wherein the device is arranged in an area that gets a lot of sunshine; and
    the house further being equipped with bio auxiliary equipment necessary for operating the device for fixing biomass-based solar heat and carbon dioxide, wherein the bio auxiliary equipment is constituted of a biomass concentrated incubator and a bio generator which generates electricity by using microorganism incubated in the biomass concentrated incubator through solar heat.

2. The house equipped with the device for fixing biomass-based solar heat and carbon dioxide gas according to claim 1 wherein,
    air pores are formed on a side wall of the box.

3. The house equipped with the device for fixing biomass-based solar heat and carbon dioxide gas according to claim 2 wherein,
    the water reservoir tray includes a water level adjustment unit which is configured to adjust a level of the water retained inside the water reservoir tray.

4. The house according to claim 3, wherein,
    the biomass concentrated incubator includes;
    a storage tank which is formed of a member having a light-blocking property and is configured to cause living plant biomass in liquid mixed with plant biomass and water to make the dark reaction of photosynthesis; and
    a biomass proliferation pipe which is formed of a pipe having a translucent property and is configured, in the course of flowing the liquid retained in the storage tank, to cause the living plant biomass contained in the liquid to make the light reaction of photosynthesis and to proliferate, and the biomass proliferation pipe includes:

an outward passage which is configured to soak up the liquid retained in the storage tank by capillary action; and a return passage which is communicated and connected with the outward passage and has a shape where a capillary force does not work with respect to the outward passage, and is configured to flow down the liquid, specific gravity of which becomes heavy due to photosynthesis in the course of soaking up in the outward passage, into the storage tank.

5. The house according to claim 4, wherein, the bio generator includes:

an evaporation unit which is configured to heat and instantly evaporate the mixed liquid of plant biomass obtained from the biomass concentrated incubator and water and to make the mixed liquid into an ionized plasma state;

a temperature difference power generation unit which is configured to generate electricity by temperature difference between the temperature of the evaporation unit and the temperature in the atmosphere;

an electromagnetic fluid power generation unit which is configured to generate electric power between the electrodes by passing the plasma between a pair of electrodes arranged in a magnetic field;

a turbine generator unit which is configured to rotate a turbine with the use of pressure of gas flow of the plasma and to generate electricity;

a gas reforming unit which is configured to adjust temperature of the gas flow and to increase concentration of hydrogen gas in the gas flow;

a preparative separation unit which is configured to separate hydrogen and carbon dioxide from the gas flow; and a fuel cell power generation unit which is configured to supply the hydrogen separated from the gas flow by the preparative separation unit and oxygen in the atmosphere to a fuel cell and to generate electricity, and furthermore, the bio generator is configured to supply the carbon dioxide separated from the gas flow by the preparative separation unit to biomass in the biomass concentrated incubator and to reproduce the plant biomass.

6. The house according to claim 2 wherein, the biomass concentrated incubator includes;

a storage tank which is formed of a member having a light-blocking property and is configured to cause living plant biomass in liquid mixed with plant biomass and water to make the dark reaction of photosynthesis; and a biomass proliferation pipe which is formed of a pipe having a translucent property and is configured, in the course of flowing the liquid retained in the storage tank, to cause the living plant biomass contained in the liquid to make the light reaction of photosynthesis and to proliferate, and the biomass proliferation pipe includes:

an outward passage which is configured to soak up the liquid retained in the storage tank by capillary action; and a return passage which is communicated and connected with the outward passage and has a shape where a capillary force does not work with respect to the outward passage, and is configured to flow down the liquid, specific gravity of which becomes heavy due to photosynthesis in the course of soaking up in the outward passage, into the storage tank.

7. The house according to claim 6, wherein the water reservoir tray includes a water level adjustment unit which is configured to adjust a level of water retained inside the water reservoir tray.

8. The house according to claim 7 wherein, the bio generator includes:

an evaporation unit which is configured to heat and instantly evaporate the mixed liquid of plant biomass obtained from the biomass concentrated incubator and water and to make the mixed liquid into an ionized plasma state;

a temperature difference power generation unit which is configured to generate electricity by temperature difference between the temperature of the evaporation unit and the temperature in the atmosphere;

an electromagnetic fluid power generation unit which is configured to generate electric power between the electrodes by passing the plasma between a pair of electrodes arranged in a magnetic field;

a turbine generator unit which is configured to rotate a turbine with the use of pressure of gas flow of the plasma and to generate electricity;

a gas reforming unit which is configured to adjust temperature of the gas flow and to increase concentration of hydrogen gas in the gas flow;

a preparative separation unit which is configured to separate hydrogen and carbon dioxide from the gas flow; and a fuel cell power generation unit which is configured to supply the hydrogen separated from the gas flow by the preparative separation unit and oxygen in the atmosphere to a fuel cell and to generate electricity, and furthermore, the bio generator is configured to supply the carbon dioxide separated from the gas flow by the preparative separation unit to biomass in the biomass concentrated incubator and to reproduce the plant biomass.

9. The house according to claim 8, wherein the water reservoir tray includes a water level adjustment unit which is configured to adjust a level of water retained inside the water reservoir tray.

10. The house according to claim 1 wherein, the biomass concentrated incubator includes;

a storage tank which is formed of a member having a light-blocking property and is configured to cause living plant biomass in liquid mixed with plant biomass and water to make the dark reaction of photosynthesis; and a biomass proliferation pipe which is formed of a pipe having a translucent property and is configured, in the course of flowing the liquid retained in the storage tank, to cause the living plant biomass contained in the liquid to make the light reaction of photosynthesis and to proliferate, and the biomass proliferation pipe includes:

an outward passage which is configured to soak up the liquid retained in the storage tank by capillary action; and a return passage which is communicated and connected with the outward passage and has a shape where a capillary force does not work with respect to the outward passage, and is configured to flow down the liquid, specific gravity of which becomes heavy due to photosynthesis in the course of soaking up in the outward passage, into the storage tank.

11. The house according to claim 10 wherein, the bio generator includes:

an evaporation unit which is configured to heat and instantly evaporate the mixed liquid of plant biomass obtained from the biomass concentrated incubator and water and to make the mixed liquid into an ionized plasma state;

a temperature difference power generation unit which is configured to generate electricity by temperature difference between the temperature of the evaporation unit and the temperature in the atmosphere;

an electromagnetic fluid power generation unit which is configured to generate electric power between the electrodes by passing the plasma between a pair of electrodes arranged in a magnetic field;

a turbine generator unit which is configured to rotate a turbine with the use of pressure of gas flow of the plasma and to generate electricity;

a gas reforming unit which is configured to adjust temperature of the gas flow and to increase concentration of hydrogen gas in the gas flow;

a preparative separation unit which is configured to separate hydrogen and carbon dioxide from the gas flow; and a fuel cell power generation unit which is configured to supply the hydrogen separated from the gas flow by the preparative separation unit and oxygen in the atmosphere to a fuel cell and to generate electricity, and furthermore, the bio generator is configured to supply the carbon dioxide separated from the gas flow by the preparative separation unit to biomass in the biomass concentrated incubator and to reproduce the plant biomass.

\* \* \* \* \*